(12) United States Patent
Cho et al.

(10) Patent No.: US 11,579,738 B2
(45) Date of Patent: Feb. 14, 2023

(54) CIRCUIT BOARD AND A DISPLAY DEVICE HAVING THE SAME

(71) Applicant: Samsung Display Co., Ltd., Yongin-Si (KR)

(72) Inventors: Hyun-Wook Cho, Yongin-Si (KR); Min-Hong Kim, Hwaseong-si (KR); Sangkook Kim, Cheonan-si (KR); TaeJoon Kim, Seongnam-si (KR); Jungmok Park, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/531,846

(22) Filed: Nov. 22, 2021

(65) Prior Publication Data
US 2022/0236830 A1    Jul. 28, 2022

(30) Foreign Application Priority Data
Jan. 25, 2021   (KR) .................. 10-2021-0010159

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05); *G06F 2203/04102* (2013.01); *G06F 2203/04107* (2013.01); *G06F 2203/04112* (2013.01)

(58) Field of Classification Search
CPC ........................... G06F 3/04164; G06F 3/0412
See application file for complete search history.

(56) References Cited

U.S. PATENT DOCUMENTS

| | | | |
|---|---|---|---|
| 10,359,880 B2 | 7/2019 | Park et al. | |
| 2016/0188059 A1* | 6/2016 | Lee | G06F 3/0412 345/173 |
| 2018/0063962 A1* | 3/2018 | Lee | H05K 1/147 |

FOREIGN PATENT DOCUMENTS

| | | |
|---|---|---|
| KR | 10-2018-0004864 | 1/2018 |
| KR | 10-2019-0042399 | 4/2019 |

* cited by examiner

*Primary Examiner* — Robin J Mishler
(74) *Attorney, Agent, or Firm* — F. Chau & Associates, LLC

(57) ABSTRACT

A circuit board including: a body part including a driving chip; a pad part including a plurality of pads connected to a plurality of lines, wherein the pad part extends in a first direction from the body part; and a line part including a first line of the lines, wherein the first line is electrically connected to the driving chip, the line part extends in the first direction from the body part, and the line part is bendable with respect to a bending line.

18 Claims, 16 Drawing Sheets

CIRCUIT BOARD AND A DISPLAY DEVICE HAVING THE SAME

CROSS-REFERENCE TO RELATED APPLICATION

This U.S. non-provisional patent application claims priority under 35 U.S.C. § 119 to Korean Patent Application No. 10-2021-0010159, filed on Jan. 25, 2021, the disclosure of which is incorporated by reference herein in its entirety.

1. TECHNICAL FIELD

The present disclosure relates to a display device. More particularly, the present disclosure relates to a circuit board and a display device having the circuit board.

2. DESCRIPTION OF THE RELATED ART

A display device is an output device for presentation of information in visual form. Various display devices are applied to multimedia devices, such as televisions, mobile phones, tablet computers, navigation units, and game units. The display devices include a display module for displaying images and sensing external inputs. For example, the display module includes a display panel for displaying images and an input sensing layer for sensing external inputs. The input sensing layer may include a touch sensor used to detect and record physical touch.

In addition, the display device includes a circuit board that applies electrical signals to drive the display panel and the input sensing layer. The circuit board is electrically connected to one of the display panel and the input sensing layer.

SUMMARY

The present disclosure provides a circuit board on which signal lines are efficiently arranged.

The present disclosure provides a display device having the circuit board.

An embodiment of the present disclosure provides a circuit board including: a body part including a driving chip; a pad part including a plurality of pads connected to a plurality of lines, wherein the pad part extends in a first direction from the body part; and a line part including a first line of the lines, wherein the first line is electrically connected to the driving chip, the line part extends in the first direction from the body part, and the line part is bendable with respect to a bending line.

The bending line may be a boundary between the body part and the line part.

The first line may include a first sub-line and a second sub-line, the first sub-line may be disposed in the body part, and the second sub-line may be disposed in the line part.

The lines may further include a second line, and the second line may be disposed in the body part and may not overlap the first line.

The pads may include a first pad connected to the first line and a second pad connected to the second line.

The first pad may include a first sub-pad and a second sub-pad, and the second pad may be disposed between the first sub-pad and the second sub-pad.

The first sub-line may connect the first sub-pad to the driving chip, and the second sub-line may connect the second sub-pad to the driving chip.

The line part may include: a first portion disposed adjacent to the second sub-pad; a second portion disposed adjacent to the driving chip; and a third portion connecting the first portion and the second portion.

The pad part and the line part may be spaced apart from each other.

The second sub-line may include at least one of a first sensing line and a second sensing line, which receive different electrical signals from each other.

The line part may include a shielding layer.

An embodiment of the present disclosure provides a circuit board including: a base substrate; a driving chip disposed on the base substrate; a plurality of signal pads disposed on the base substrate; and a plurality of signal lines connecting the driving chip and the signal pads, the base substrate including: a body part in which the driving chip is disposed; a pad part in which the signal pads are disposed, the pad part extending in a first direction from the body part; and a line part extending in the first direction from the body part and spaced apart from the pad part, the signal lines including: a first line on the line part; and a second line on the body part, wherein the line part is bendable.

The base substrate may include: a first insulating layer including the pad part and the line part; and a second insulating layer disposed on the first insulating layer, wherein the driving chip is disposed on the second insulating layer.

The first line and the second line may receive different electrical signals from each other and may not overlap each other.

An embodiment of the present disclosure provides a display device including: a display module including a display panel and an input sensing layer, wherein the display module includes a display part and a bending part bendable from the display part; and a circuit board electrically coupled with the bending part, the circuit board including: a body part including a driving chip; a pad part including a plurality of pads bonded to the bending part, wherein the pad part extends toward the display panel from the body part; and a line part including a first line electrically connecting a first pad of the pads to the driving chip, wherein the line part extends in the same direction as the pad part, and the line part is spaced apart from the pad part and bendable with respect to a bending line.

The first line may include a first sensing line and a second sensing line, which are connected to the input sensing layer.

The display device may further include a second line connected to the display panel via a second pad of the pads, wherein the second line may be disposed in the body part and not overlap the first line.

The display module may further include a pixel driving chip disposed on a first surface of the bending part.

The line part may be bent and disposed on a second surface of the bending part, which is opposite to the first surface of the bending part.

The line part may include a shielding layer, and the line part may be bent and disposed on the first surface of the bending part to overlap the pixel driving chip.

BRIEF DESCRIPTION OF THE DRAWINGS

The above and other features of the present disclosure will become readily apparent by reference to the following detailed description when considered in conjunction with the accompanying drawings wherein.

DETAILED DESCRIPTION OF THE EMBODIMENTS

Figure 1:
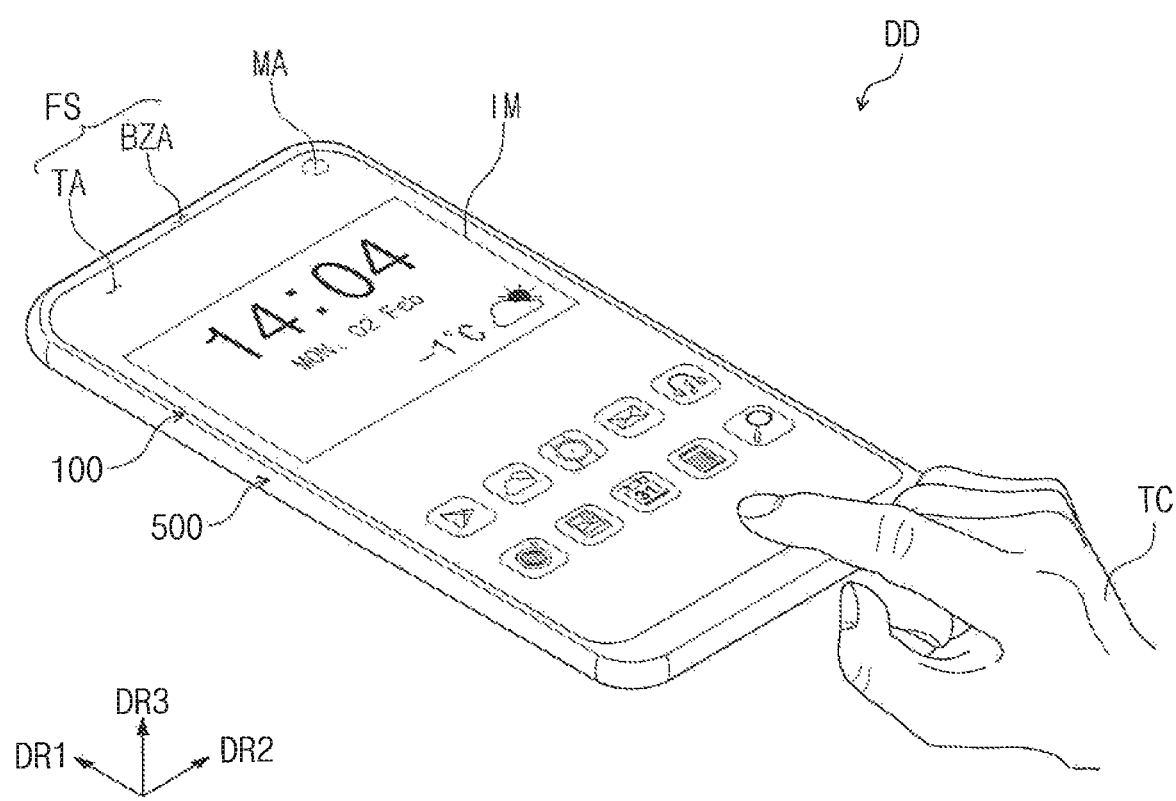
FIG. 1 is an assembled perspective view showing a display device according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals may refer to like elements throughout. In the drawings, the thickness, ratio, and dimension of components may be exaggerated for effective description of the technical content. As used herein, the term "and/or" includes any and all combinations of one or more of the associated listed items.

It will be understood that, although the terms first, second, etc. may be used herein to describe various elements, these elements should not be limited by these terms. These terms are used to distinguish one element from another element. Thus, a first element discussed below could be termed a second element. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be explained in detail with reference to the accompanying drawings.

Figure 2:
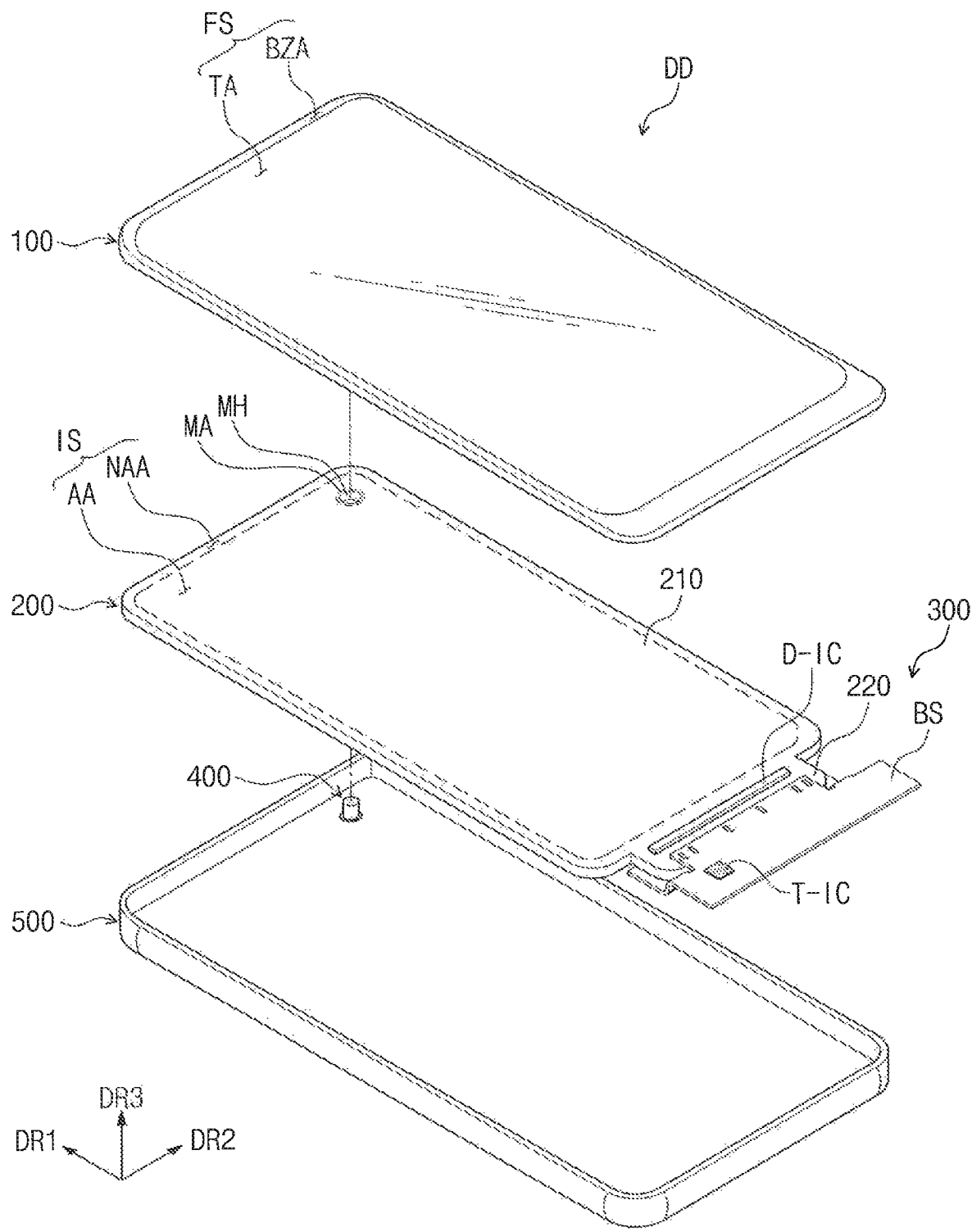
FIG. 2 is an exploded perspective view showing a display device according to an embodiment of the present disclosure.

FIG. 1 is an assembled perspective view showing a display device DD according to an embodiment of the present disclosure. FIG. 2 is an exploded perspective view showing the display device DD according to an embodiment of the present disclosure.

The display device DD may be an apparatus activated in response to an electrical signal. The display device DD may include various embodiments. The display device DD may be a tablet computer, a notebook computer, a computer (such as, a desktop computer), or a smart television. In the present embodiment, a smart phone will be described as an example of the display device DD.

Referring to FIG. 1, the display device DD may display an image IM through a front surface FS. The front surface FS may include a transmission area TA and a bezel area BZA adjacent to the transmission area TA. The transmission area TA may be a display area and the bezel area BZA may be a non-display area.

The front surface FS is substantially parallel to a surface formed by a first direction DR1 and a second direction DR2. A normal line direction of the front surface FS, e.g., a thickness direction of the display device DD, may indicate a third direction DR3. In the following descriptions, the expression "when viewed in a plane or in a plane" may mean a state of being viewed in the third direction DR3. Front (or upper) and rear (or lower) surfaces of each layer or each unit may be distinguished from each other in the third direction DR3. However, directions indicated by the first, second, and third directions DR1, DR2, and DR3 are relative to each other, and thus, the directions indicated by the first, second, and third directions DR1, DR2, and DR3 may be changed to other directions, for example, opposite directions.

The display device DD may display the image IM through the transmission area TA. The image IM may include a still image and a video. FIG. 1 shows a clock widget and application icons as a representative example of the image IM.

The transmission area TA may have a quadrangular shape parallel to each of the first direction DR1 and the second direction DR2, however, this is merely an example. The transmission area TA may have a variety of shapes, and the shape of the transmission area TA should not be particularly limited. For example, the transmission area TA may be formed as a circle.

The bezel area BZA may surround the transmission area TA, however, this is merely an example. The bezel area BZA may be disposed adjacent to only one side of the transmission area TA or may be omitted.

The display device DD may sense a user input TC (or an external input) applied thereto from the outside. The user input TC may include external inputs of various forms, such as a part of the user's body, light, heat, or pressure. In addition, the display device DD may sense the external inputs, e.g., a proximity input, applied when approaching close to or adjacent to the display device DD as well as a touch input. In addition to the user input TC, the display device DD may sense external inputs provided from a device such as an electronic pen.

In the present embodiment, the user input TC is shown as a touch operation using the user's hand applied to the front surface FS, however, this is merely an example. As described above, the user input TC may be provided in various forms, and the display device DD may sense the user input TC applied to a side or rear surface of the display device DD depending on a structure of the display device DD.

Referring to FIG. 2, the display device DD may include a window 100, a display module 200, a circuit board 300, an electronic module 400, and an outer case 500. The window 100 and the outer case 500 may be coupled to each other to form an exterior of the display device DD.

The window 100 may be disposed on the display module 200 and may cover a front surface IS of the display module 200. The window 100 may include an optically transparent insulating material. For example, the window 100 may include glass or plastic. The window 100 may have a single-layer or multi-layer structure. For example, the window 100 may have a stack structure of a plurality of plastic films attached to each other by an adhesive or may have a stack structure of a glass substrate and a plastic film attached to the glass substrate by an adhesive.

The window 100 may include a front surface FS exposed to the outside. The front surface FS of the display device DD may be defined by the front surface FS of the window 100. Herein, the front surface FS of the window 100 and the front surface FS of the display device DD are used interchangeably. The transmission area TA may be an optically transparent area. The transmission area TA may have a shape corresponding to an active area AA formed in the display module 200. For example, the transmission area TA may overlap an entire surface or at least a portion of the active area AA. The image IM displayed through the active area AA of the display module 200 may be viewed from the outside through the transmission area TA.

The bezel area BZA may have a relatively lower light transmittance than that of the transmission area TA. The bezel area BZA may define the shape of the transmission area TA. The bezel area BZA may be adjacent to the transmission area TA and may surround the transmission area TA.

The bezel area BZA may have a predetermined color. When the window 100 includes a glass or plastic substrate, the bezel area BZA may be a color layer printed or deposited on one surface of the glass or plastic substrate. As another example, the bezel area BZA may be formed by coloring a corresponding area of the glass or plastic substrate.

The bezel area BZA may cover a peripheral area NAA of the display module 200 to prevent the peripheral area NAA from being viewed from the outside, however, this is merely an example. In the window 100 according to the present embodiment, the bezel area BZA may be omitted.

The display module 200 may include a display panel DP and an input sensing layer ISU, which are to be described with reference to FIGS. 3A to 3B. The display panel DP may include configurations appropriate to generate the image IM (see FIG. 1). The image IM generated by the display panel DP may be viewed from the outside by a user through the transmission area TA. The input sensing layer ISU (see FIG. 3A) may sense the external input TC applied thereto.

The display module 200 may include a display part 210 and a bending part 220. The display part 210 may be a part in which the image is displayed and may include the front surface IS of the display module 200 and a rear surface opposite to the front surface IS. The bending part 220 may be a part in which the circuit board 300 is bonded, and the bending part 220 may be bent toward a rear surface of the display part 210. In other words, the bending part 220 may be bent such that it is disposed beneath the display module 200 when the display device DD is configured.

According to an embodiment of the present disclosure, the front surface IS of the display module 200 may include a first area and a second area adjacent to the first area. The first area may correspond to a module area MA and the active area AA surrounding the module area MA, and the second area may correspond to the peripheral area NAA. The active area AA may be a display area that is activated in response to an electrical signal. The module area MA and the second area may be a non-display area in which the image is not displayed.

The active area AA may be the display area through which the image IM is displayed and may be a sensing area in which the external input TC is sensed. The transmission area TA may overlap at least the active area AA. For example, the transmission area TA may overlap the entire surface or at least a portion of the active area AA. Accordingly, the user may view the image IM through the transmission area TA or may provide the external input TC through the transmission area TA, however, this is merely an example. In the active area AA, an area through which the image IM is displayed and an area in which the external input TC is sensed may be separated from each other, and they should not be limited thereto or thereby.

The peripheral area NAA may be covered by the bezel area BZA. The peripheral area NAA may be disposed adjacent to the active area AA. The peripheral area NAA may surround the active area AA. Various signal lines, pads, or electronic devices, which provide electrical signals to the active area AA, may be disposed in the peripheral area NAA. The peripheral area NAA may be covered by the bezel area BZA, and thus, the peripheral area NAA may not be viewed from the outside. As shown in FIG. 2, a pixel driving chip D-IC that applies electrical signals to the active area AA may be disposed in the bending part 220 of the display module 200. The pixel driving chip D-IC may output electrical signals to generate the image displayed through the active area AA.

In the present embodiment, the display module 200 may be assembled in a flat state such that the active area AA and the peripheral area NAA face the window 100, however, this is merely an example. A portion of the peripheral area NAA of the display module 200 may be bent. In this case, the portion of the peripheral area NAA may be bent toward the rear surface of the display device DD, and thus, a size of the bezel area BZA is reduced in the front surface FS of the display device DD. For example, the peripheral area NAA may be bent such that the pixel driving chip D-IC is disposed beneath the rear surface of the display device DD. As another example, the display module 200 may be assembled to have a partially-bent shape in the active area AA. In addition, according to an embodiment of the present disclosure, the peripheral area NAA may be omitted from the display module 200.

The module area MA may have a relatively high transmittance compared with the active area AA on the basis of the same area size. At least a portion of the module area MA may be surrounded by the active area AA. In the present embodiment, the module area MA may be spaced apart from the peripheral area NAA. The module area MA may be provided in the active area AA such that an entire edge of the module area MA is surrounded by the active area AA.

The display module 200 may include a panel hole MH passing through the display module 200 in the module area MA. The panel hole MH may penetrate through at least one of the display panel DP (refer to FIG. 3A) and the input sensing layer ISU (refer to FIG. 3A). The edge of the module area MA may be spaced apart from an edge of the panel hole MH and may extend along the edge of the panel hole MH. The edge of the module area MA may have a shape corresponding to the panel hole MH.

The circuit board 300 may be connected to one end of the display module 200. The circuit board 300 may be connected to the bending part 220 of the display module 200. The circuit board 300 may apply various electrical signals to drive the display module 200. For instance, the circuit board 300 may apply image signals to the pixel driving chip D-IC, and the circuit board 300 may provide sensing signals to drive the input sensing layer ISU (refer to FIG. 3A). According to an embodiment of the present disclosure, the circuit board 300 may be a substrate having a flexible property or a substrate having a rigid property. In the present disclosure, the circuit board 300 will be described as a flexible printed circuit board.

In detail, the circuit board 300 may include a base substrate BS and a sensing driving chip T-IC.

The base substrate BS may be a base layer supporting a plurality of signal lines (not shown) and the sensing driving chip T-IC.

The sensing driving chip T-IC may be disposed on the base substrate BS. The sensing driving chip T-IC may be electrically connected to the display module 200 via the signal lines. The sensing driving chip T-IC may generate a sensing signal to sense the external input TC or may process the sensed signal.

The sensing driving chip T-IC and the signal lines may be disposed on the base substrate BS. As an example, the signal lines may include a plurality of first lines TL (refer to FIG. 6) electrically connected to the sensing driving chip T-IC, which is shown in FIG. 7, and a plurality of second lines SL (refer to FIG. 6) used to apply electrical signals to the pixel driving chip D-IC. In particular, as a resolution of the image increases, the number of the second lines SL that transmit image signals to the pixel driving chip D-IC may increase. As a result, an area required to dispose the first lines TL for applying the sensing signal to the sensing driving chip T-IC on the base substrate BS may decrease. The present disclosure may provide a structure that secures the area in which the first lines TL are arranged and reduces a size of the base substrate BS.

Figure 6:
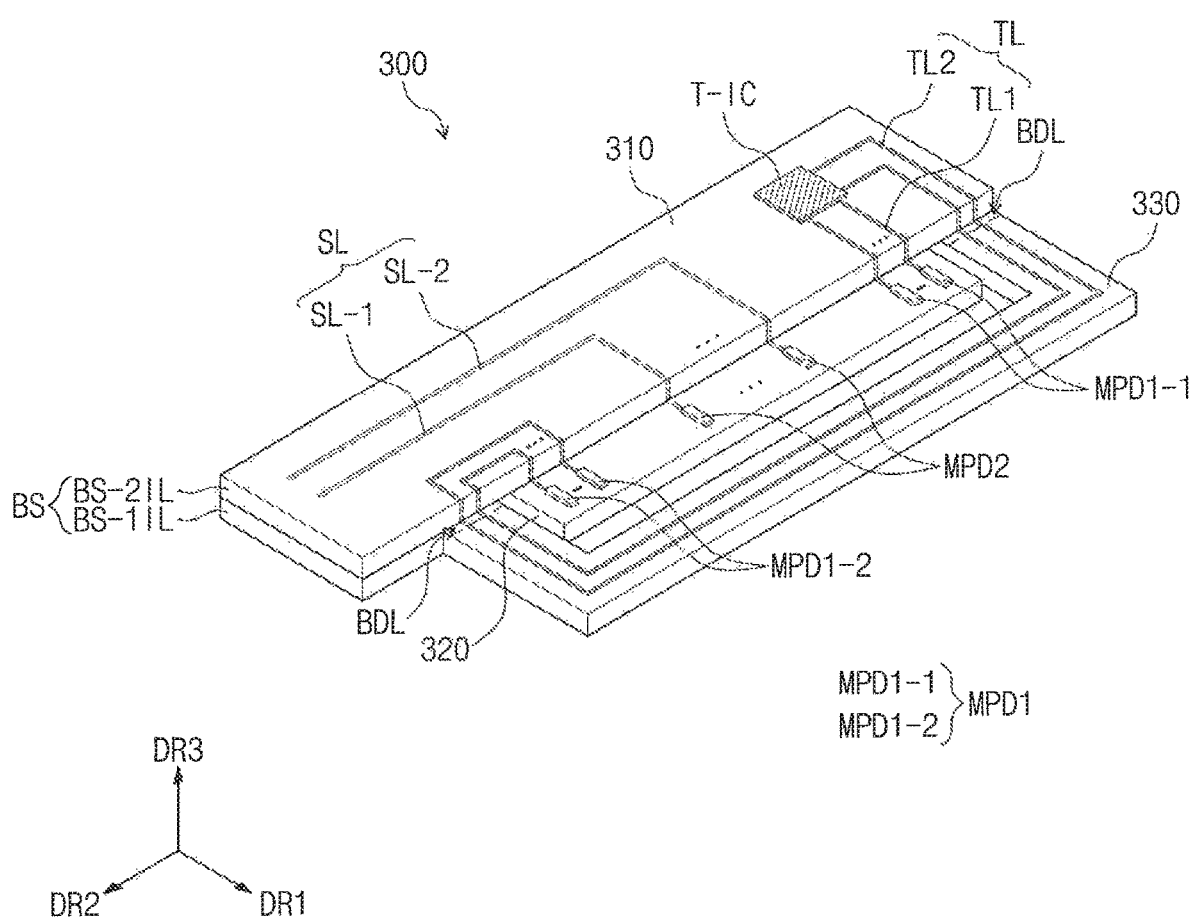
FIG. 6 is a perspective view showing a circuit board according to an embodiment of the present disclosure.
Figure 7:
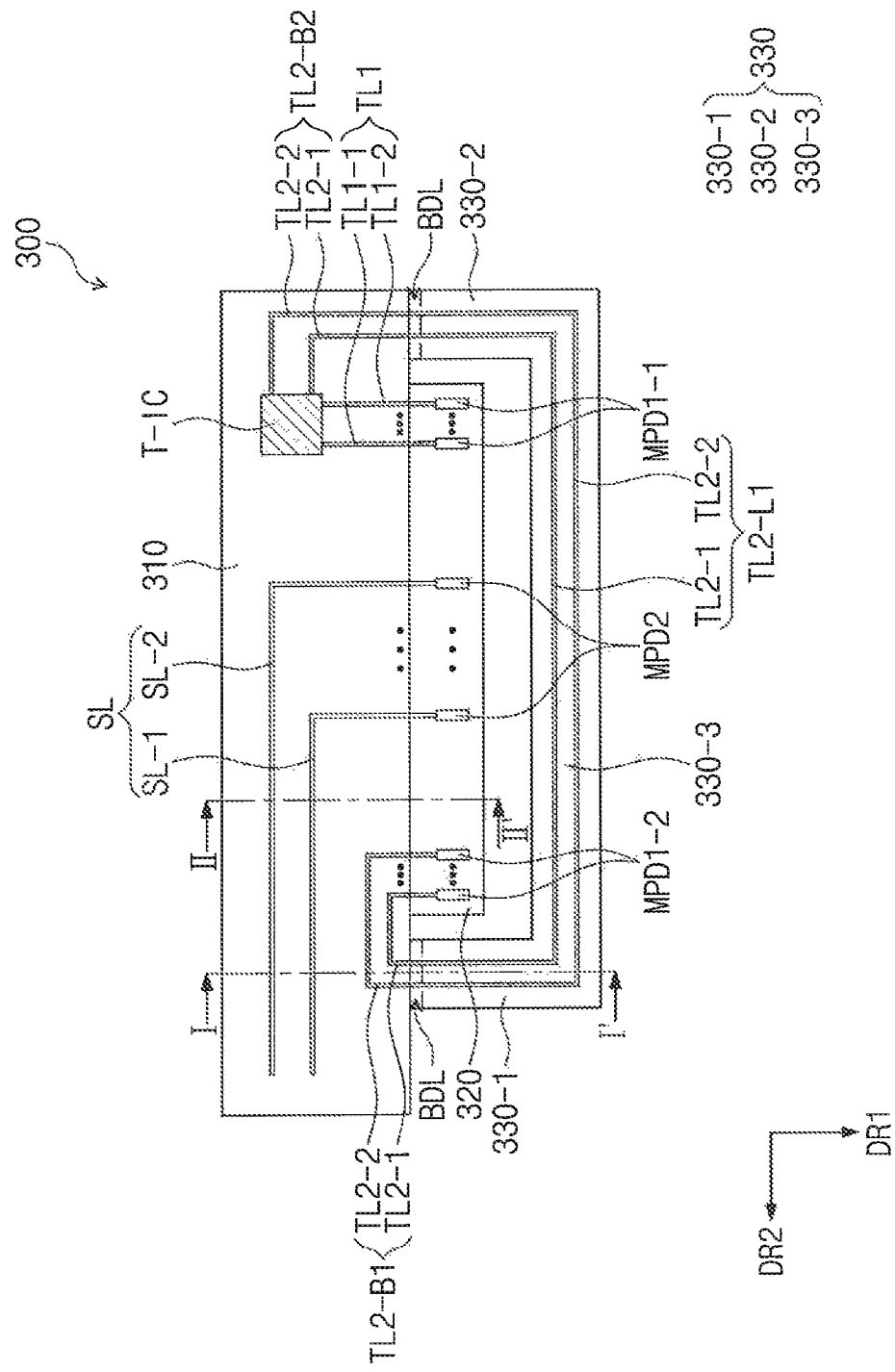
FIG. 7 is a plan view showing a circuit board according to an embodiment of the present disclosure.

According to an embodiment of the present disclosure, the first lines TL of the circuit board 300 may be disposed in a line part 330 (refer to FIG. 6). When viewed in a plane, the line part 330 may extend in the first direction DR1 from a body part of the circuit board 300 to the display module 200. The line part 330 may be bent towards a rear surface of the display module 200 when the circuit board 300 is bonded to the display module 200. The line part may be disposed on the rear surface of the display module 200. Accordingly, the display device DD may have a structure in which the area occupied by the circuit board 300 in the display device DD is reduced and the area in which the first lines are arranged is secured. This will be described in more detail with reference to FIGS. 6 to 10B.

The electronic module 400 may be disposed under the window 100. The electronic module 400 may overlap the panel hole MH in the module area MA. The electronic module 400 may receive the external input transmitted through the module area MA or may provide an output through the module area MA.

Among components of the electronic module 400, a receiving unit for receiving the external input or an outputting unit for providing the output may overlap the module area MA in a plane. All or a portion of the electronic module 400 may be accommodated in the module area MA or the panel hole MH. According to an embodiment of the present disclosure, since the electronic module 400 overlaps the active area AA, the size of the bezel area BZA may be reduced.

Figure 3A:
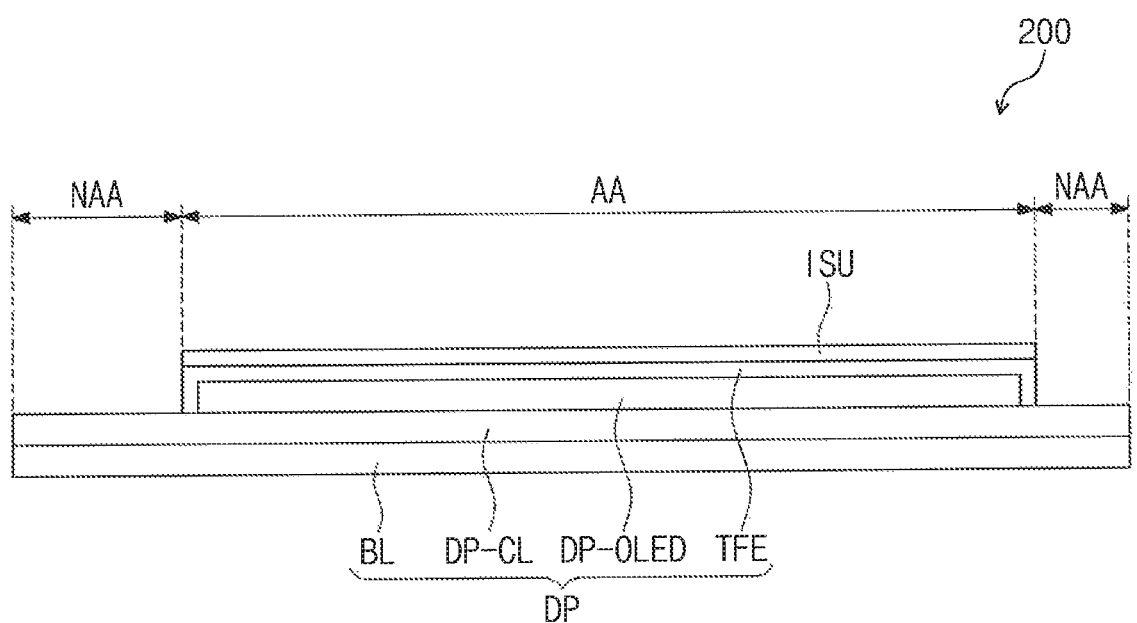
FIG. 3A is a cross-sectional view showing a display module according to an embodiment of the present disclosure.

FIG. 3A is a cross-sectional view showing the display module 200 according to an embodiment of the present disclosure. FIG. 3B is a plan view showing the display panel DP according to an embodiment of the present disclosure. FIG. 3C is an equivalent circuit diagram showing a pixel PX according to an embodiment of the present disclosure. FIG. 3D is an enlarged cross-sectional view showing the display panel DP according to an embodiment of the present disclosure.

Referring to FIG. 3A, the display module 200 may include the display panel DP and the input sensing layer ISU disposed on the display panel DP. The display panel DP may include a base layer BL, a circuit element layer DP-CL disposed on the base layer BL, a display element layer DP-OLED disposed on the circuit element layer DP-CL, and a thin film encapsulation layer TFE disposed on the display element layer DP-OLED. The base layer BL, circuit element layer DP-CL, display element layer DP-OLED, and thin film encapsulation layer TFE may be sequentially arranged.

The base layer BL may include at least one plastic film. The base layer BL may include a plastic substrate, a glass substrate, a metal substrate, or an organic/inorganic composite substrate as a flexible substrate. The base layer BL may be a member that supports components of the display panel DP and will be described as a display substrate in the following descriptions.

The circuit element layer DP-CL may include at least one intermediate insulating layer and a circuit element. The intermediate insulating layer may include at least one intermediate inorganic layer and/or at least one intermediate organic layer. The circuit element may include signal lines and a pixel driving circuit.

The display element layer DP-OLED may include a plurality of organic light emitting diodes. The display element layer DP-OLED may further include an organic layer such as a pixel definition layer. According to an embodiment of the present disclosure, when a liquid crystal display panel is used as the display panel, the display element layer may be a liquid crystal layer.

The thin film encapsulation layer TFE may encapsulate the display element layer DP-OLED. The thin film encapsulation layer TFE may cover a top surface and opposite sides of the display element layer DP-OLED. The thin film encapsulation layer TFE may protect the display element layer DP-OLED from moisture, oxygen, and a foreign substance such as dust particles, however, it should not be limited thereto or thereby. An encapsulation substrate may be used instead of the thin film encapsulation layer TFE. In this case, the encapsulation substrate may face the base layer BL, and the circuit element layer DP-CL and the display element layer DP-OLED may be disposed between the encapsulation substrate and the base layer BL.

The input sensing layer ISU may be disposed on the thin film encapsulation layer TFE. The input sensing layer ISU may sense an input applied thereto from the outside. The input applied from the outside may be provided in various forms. As an example, the external input may include various forms, such as a part of the user's body, a stylus pen, light, heat, or pressure. In addition to an input by contacting a part of the user's body, such as a user's hand, a proximity or approaching space touch (e.g., hovering) may be a form of the external input.

The input sensing layer ISU may be disposed directly on the thin film encapsulation layer TFE. In the present disclosure, the expression "component A is disposed directly on component B" may mean that no intervening elements, such as an adhesive layer, are present between the component A and the component B. The input sensing layer ISU may be formed together with the display panel DP through successive processes. However, the present disclosure should not be limited thereto or thereby. The input sensing layer ISU may be coupled to the display panel DP by an adhesive layer after being provided as a separate panel.

Figure 3B:
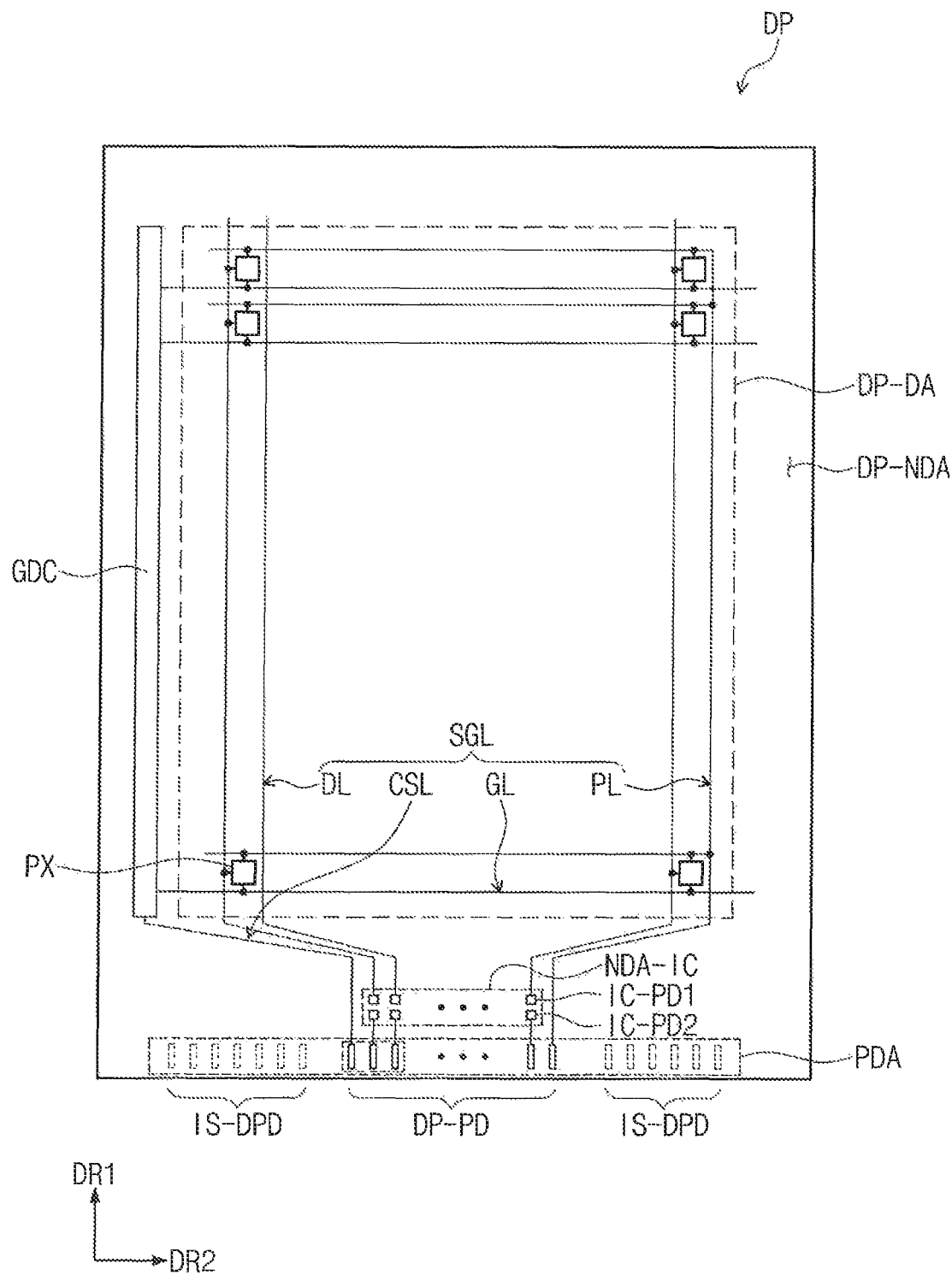
FIG. 3B is a plan view showing a display panel according to an embodiment of the present disclosure.
Figure 3C:
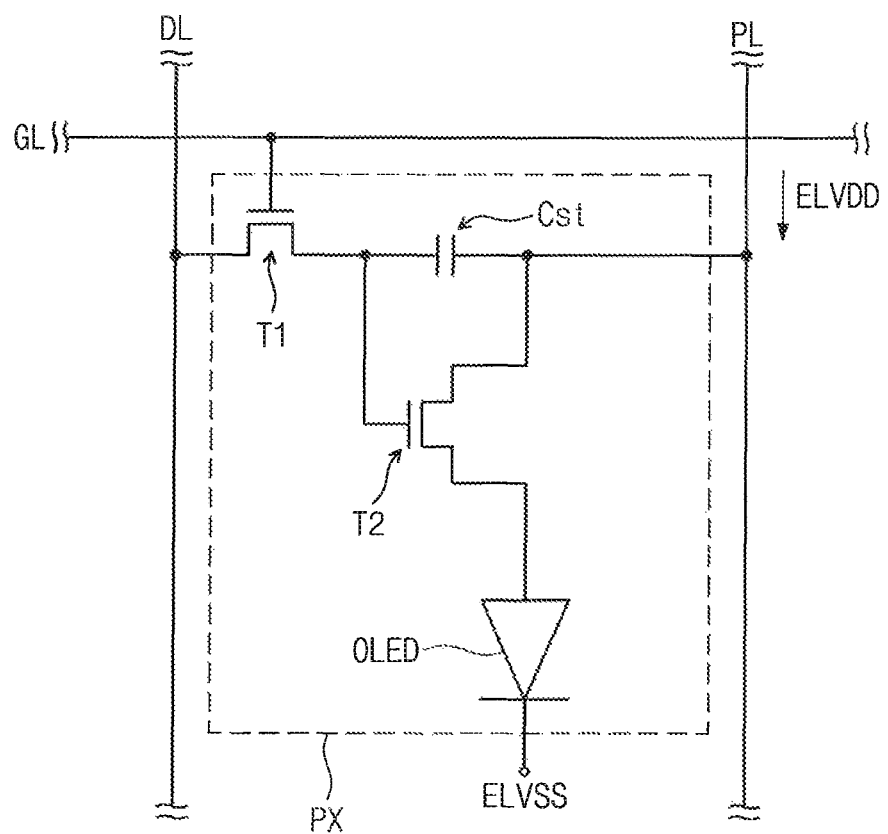
FIG. 3C is an equivalent circuit diagram showing a pixel according to an embodiment of the present disclosure.
Figure 3D:
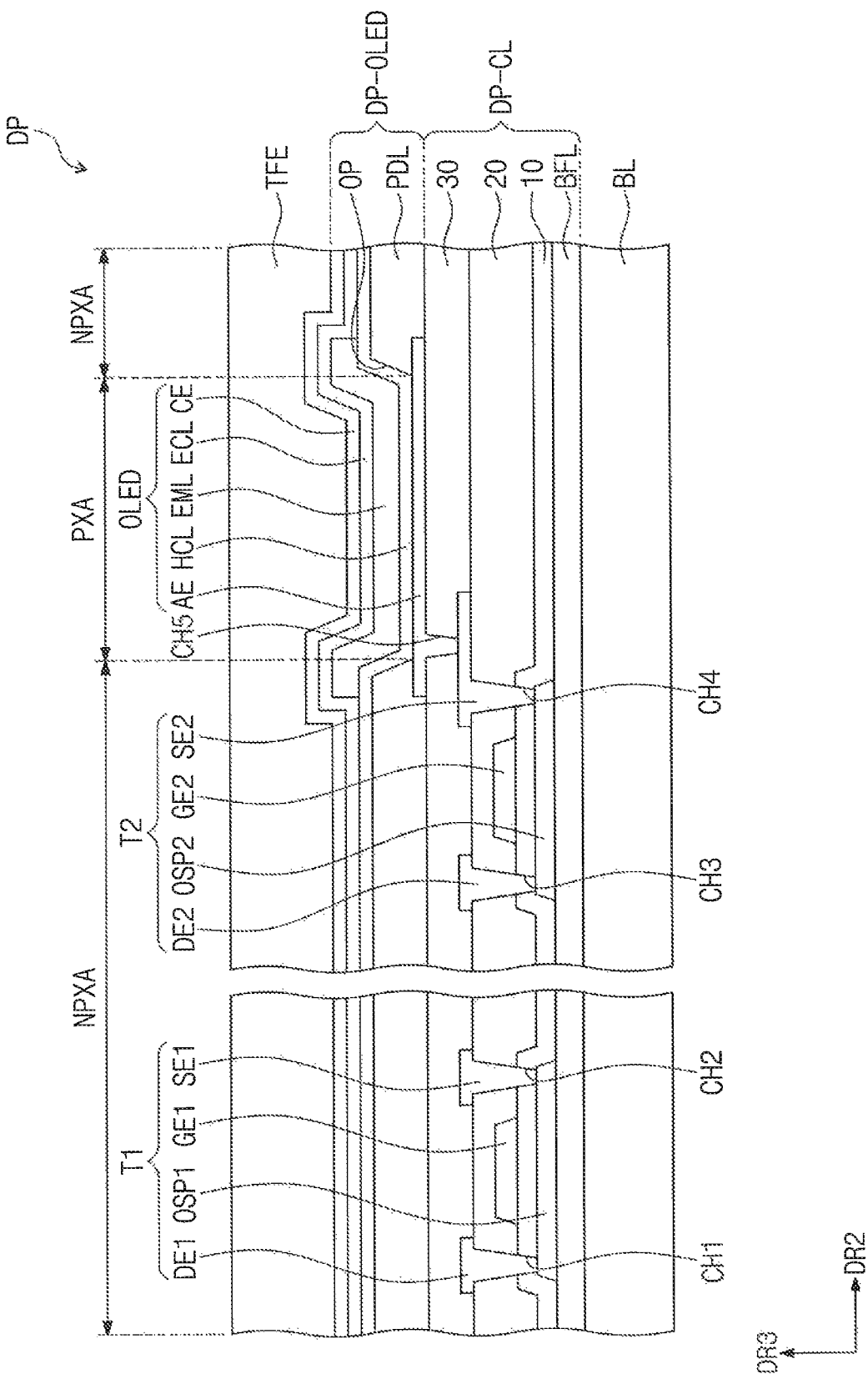
FIG. 3D is an enlarged cross-sectional view showing a display panel according to an embodiment of the present disclosure.

Referring to FIG. 3B, the display panel DP may include a display area DP-DA and a non-display area DP-NDA when viewed in a plane. In the present embodiment, the non-display area DP-NDA may be provided along an edge of the display area DP-DA. The display area DP-DA and the non-display area DP-NDA of the display panel DP may respectively correspond to the active area AA and the peripheral area NAA of the display device DD shown in FIGS. 1 and 2.

The display panel DP may include a driving circuit GDC, a plurality of signal lines SGL, a plurality of signal pads DP-PD, and a plurality of pixels PX. The pixels PX may be arranged in the display area DP-DA. Each of the pixels PX may include the organic light emitting diode and the pixel driving circuit connected to the organic light emitting diode. The driving circuit GDC, the signal lines SGL, the signal pads DP-PD, and the pixel driving circuit may be included in the circuit element layer DP-CL shown in FIG. 3A.

The driving circuit GDC may include a scan driving circuit. The driving circuit GDC may generate a plurality of scan signals and may sequentially output the scan signals to a plurality of scan lines GL to be described later. The scan signals may also be referred to as gate signals and the scan lines GL may also be referred to as gate lines. The driving circuit GDC may further output other control signals to the pixel driving circuit of the pixels PX.

The driving circuit GDC may include a plurality of thin film transistors formed through the same processes, e.g., a low temperature polycrystalline silicon (LTPS) process or a low temperature polycrystalline oxide (LTPO) process, as the pixel driving circuit of the pixels PX.

The signal lines SGL may include the scan lines GL, data lines DL, a power line PL, and a control signal line CSL. Each of the scan lines GL may be connected to a corresponding pixel among the pixels PX, and each of the data lines DL may be connected to a corresponding pixel among the pixels PX. The power line PL may be connected to the pixels PX. The control signal line CSL may apply control signals to the scan driving circuit.

The signal lines SGL may overlap the display area DP-DA and the non-display area DP-NDA. The signal lines SGL may include a pad part and a line part. The line part may overlap the display area DP-DA and the non-display area DP-NDA. The pad part may be connected to an end of the line part. The pad part may be disposed in the non-display area DP-NDA and may overlap a corresponding signal pad among the signal pads DP-PD. This will be described in detail later. An area of the non-display area DP-NDA in which the signal pads DP-PD are arranged may be referred to as a pad area PDA. According to an embodiment of the present disclosure, the pad area PDA may be bent from the display area DP-DA. In other words, the pad area PDA may be disposed above the bending part 220 (refer to FIG. 2).

The circuit board 300 (refer to FIG. 2) may be coupled with the pad area PDA. The signal pads DP-PD may be electrically connected to a second pad MPD2 (refer to FIG. 6) of the circuit board 300 (refer to FIG. 2), which is to be described later.

The line part connected to the pixel PX may form most of the signal lines SGL. The line part may be connected to transistors T1 and T2 (refer to FIG. 3D) of the pixel PX. The line part may have a single-layer or multi-layer structure, and the line part may be provided in a single body or may include two or more portions. The two or more portions may be disposed on different layers from each other and may be connected to each other via a contact hole passing through an insulating layer disposed between the two or more portions.

The display panel DP may further include dummy pads IS-DPD disposed in the pad area PDA. The dummy pads IS-DPD may be provided on opposite sides of the signal pads DP-PD. Since the dummy pads IS-DPD are formed through the same process as the signal lines SGL, the dummy pads IS-DPD may be disposed on the same layer as the signal lines SGL. The dummy pads IS-DPD may be selectively provided to the display device DD (refer to FIGS. 1 and 2) including the input sensing layer ISU (refer to FIG. 3A).

The dummy pads IS-DPD may overlap a pad part TSL-P of the signal lines included in the input sensing layer ISU described with reference to FIG. 5A. The dummy pads IS-DPD may be a floating electrode. The dummy pads IS-DPD may be electrically insulated from the signal lines SGL of the display panel DP.

According to an embodiment of the present disclosure, the display panel DP may further include a chip mounting area NDA-IC disposed in the non-display area DP-NDA. The pixel driving chip D-IC (refer to FIG. 2) in a chip form may be mounted in the chip mounting area NDA-IC.

First chip pads IC-PD1 and second chip pads IC-PD2 may be disposed in the chip mounting area NDA-IC. The first chip pads IC-PD1 may be formed in a first row and the second chip pads IC-PD2 may be formed in a second row, the first row being closer to the display area DP-DA than the second row. The first chip pads IC-PD1 may be connected to the data lines DL, and the second chip pads IC-PD2 may be connected to the signal pads DP-PD via the signal lines. Terminals of the pixel driving chip D-IC (refer to FIG. 2) may be connected to the first chip pads IC-PD1 and the second chip pads IC-PD2. Consequently, the data lines DL may be electrically connected to the signal pads DP-PD via the pixel driving chip D-IC.

According to an embodiment of the present disclosure, at least one of the control signal line CSL and the power line PL may be connected to pixel driving chip D-IC.

FIG. 3C shows one scan line GL, one data line DL, the power line PL, and the pixel PX connected to the scan line GL, the data line DL, and the power line PL. However, the configuration of the pixel PX should not be limited to that shown in FIG. 3C.

With reference to FIG. 3C, the organic light emitting diode OLED may be a front surface light-emitting type diode or a rear surface light-emitting type diode. The pixel PX may include a first transistor T1 (or a switching transistor), a second transistor T2 (or a driving transistor), and a capacitor Cst as the pixel driving circuit to drive the organic light emitting diode OLED. A first power supply voltage ELVDD may be applied to the second transistor T2, and a second power supply voltage ELVSS may be applied to the organic light emitting diode OLED. The second power supply voltage ELVSS may be lower than the first power supply voltage ELVDD.

The first transistor T1 may output a data signal applied thereto via the data line DL in response to a scan signal applied thereto via the scan line GL. The capacitor Cst may be charged with a voltage corresponding to the data signal from the first transistor T1. The second transistor T2 may be connected to the organic light emitting diode OLED. For example, the second transistor T2 may be connected to an anode of the organic light emitting diode OLED. The second transistor T2 may control a driving current flowing through the organic light emitting diode OLED in response to electric charges charged in the capacitor Cst.

The equivalent circuit shown in FIG. 3C is merely an example, and the present disclosure should not be limited thereto or thereby. The pixel PX may further include a plurality of transistors and may include more capacitors. The organic light emitting diode OLED may be connected between the power line PL and the second transistor T2.

FIG. 3D is a cross-sectional view showing a portion of the display panel DP corresponding to the equivalent circuit shown in FIG. 3C.

The circuit element layer DP-CL, the display element layer DP-OLED, and a thin film encapsulation layer TFE may be sequentially disposed on a base layer BL. In the present embodiment, the circuit element layer DP-CL may include a buffer layer BFL, a first intermediate inorganic layer 10, and a second intermediate inorganic layer 20, each of which is an inorganic layer, and an intermediate organic layer 30 that is an organic layer. Materials for the inorganic layer and the organic layer should not be particularly limited, and the buffer layer BFL may be selectively disposed or omitted.

A semiconductor pattern OSP1 (hereinafter, referred to as a first semiconductor pattern) of the first transistor T1 and a semiconductor pattern OSP2 (hereinafter, referred to as a second semiconductor pattern) of the second transistor T2 may be disposed on the buffer layer BFL. The first semiconductor pattern OSP1 and the second semiconductor pattern OSP2 may include amorphous silicon, polysilicon, or metal oxide semiconductor.

The first intermediate inorganic layer 10 may be disposed on the first semiconductor pattern OSP1 and the second semiconductor pattern OSP2. A control electrode GE1 (hereinafter, referred to as a first control electrode) of the first transistor T1 and a control electrode GE2 (hereinafter, referred to as a second control electrode) of the second transistor T2 may be disposed on the first intermediate inorganic layer 10. The first control electrode GE1 and the second control electrode GE2 may be manufactured through the same photolithography process as the scan lines GL (refer to FIG. 5A).

The second intermediate inorganic layer 20 may be disposed on the first intermediate inorganic layer 10 to cover the first control electrode GE1 and the second control electrode GE2. An input electrode DE1 (hereinafter, referred to as a first input electrode) and an output electrode SE1 (hereinafter, referred to as a first output electrode) of the first transistor T1 and an input electrode DE2 (hereinafter, referred to as a second input electrode) and an output electrode SE2 (hereinafter, referred to as a second output electrode) of the second transistor T2 may be disposed on the second intermediate inorganic layer 20.

The first input electrode DE1 and the first output electrode SE1 may be connected to the first semiconductor pattern OSP1 via a first contact hole CH1 and a second contact hole CH2 respectively, which are provided through the first intermediate inorganic layer 10 and the second intermediate inorganic layer 20. The second input electrode DE2 and the second output electrode SE2 may be connected to the second semiconductor pattern OSP2 via a third contact hole CH3 and a fourth contact hole CH4 respectively, which are provided through the first intermediate inorganic layer 10 and the second intermediate inorganic layer 20. According to an embodiment of the present disclosure, the first transistor T1 and/or the second transistor T2 may be implemented in a bottom-gate structure.

The intermediate organic layer 30 may be disposed on the second intermediate inorganic layer 20 to cover the first input electrode DE1, the second input electrode DE2, the first output electrode SE1, and the second output electrode SE2. The intermediate organic layer 30 may provide a flat surface.

The display element layer DP-OLED may be disposed on the intermediate organic layer 30. The display element layer DP-OLED may include a pixel definition layer PDL and the organic light emitting diode OLED. The pixel definition layer PDL may include an organic material. A first electrode AE may be disposed on the intermediate organic layer 30. The first electrode AE may be connected to the second output electrode SE2 via a fifth contact hole CH5 provided through the intermediate organic layer 30. An opening OP may be provided in the pixel definition layer PDL. At least a portion of the first electrode AE may be exposed through the opening OP of the pixel definition layer PDL. According to an embodiment of the present disclosure, the pixel definition layer PDL may be omitted.

The pixel PX may be disposed in the display area DP-DA (see FIG. 3B). The display area DP-DA may include a light emitting area PXA and a non-light-emitting area NPXA adjacent to the light emitting area PXA. The non-light-emitting area NPXA may surround the light emitting area PXA. In the present embodiment, the light emitting area PXA may correspond to a portion of the first electrode AE exposed through the opening OP.

According to an embodiment of the present disclosure, the light emitting area PXA may overlap at least one of the first and second transistors T1 and T2. The opening OP may become wider, and the first electrode AE and a light emitting layer EML to be described later may become wider.

A hole control layer HCL may be commonly disposed in the light emitting area PXA and the non-light-emitting area NPXA. A common layer such as the hole control layer HCL may be commonly formed over the pixels PX.

The light emitting layer EML may be disposed on the hole control layer HCL. The light emitting layer EML may be disposed in an area corresponding to the opening OP. In other words, the light emitting layer EML may be formed in each of the pixels PX after being divided into portions. The light emitting layer EML may include an organic material and/or an inorganic material. The light emitting layer EML may generate light of a predetermined color.

In the present embodiment, the patterned light emitting layer EML is shown as a representative example, however, the light emitting layer EML may be commonly disposed over the pixels PX. In this case, the light emitting layer EML may generate a white light. In addition, the light emitting layer EML may have a multi-layer structure that is called a tandem.

An electron control layer ECL may be disposed on the light emitting layer EML. The electron control layer ECL may be commonly formed over the pixels PX. A second electrode CE may be disposed on the electron control layer ECL. The second electrode CE may be commonly disposed over the pixels PX.

The thin film encapsulation layer TFE may be disposed on the second electrode CE. The thin film encapsulation layer TFE may be commonly disposed over the pixels PX. In the present embodiment, the thin film encapsulation layer TFE may directly cover the second electrode CE. In other words, the thin film encapsulation layer TFE may be in direct contact with the second electrode CE. According to an embodiment of the present disclosure, a capping layer may be further disposed between the thin film encapsulation layer TFE and the second electrode CE to cover the second electrode CE. In this case, the thin film encapsulation layer TFE may directly cover the capping layer.

According to an embodiment of the present disclosure, the organic light emitting diode OLED may further include a resonant structure to control a resonant distance of a light generated by the light emitting layer EML. The resonant structure may be disposed between the first electrode AE and the second electrode CE, and the resonant structure may have a thickness that is determined depending on a wavelength of the light generated by the light emitting layer EML.

Figure 4:
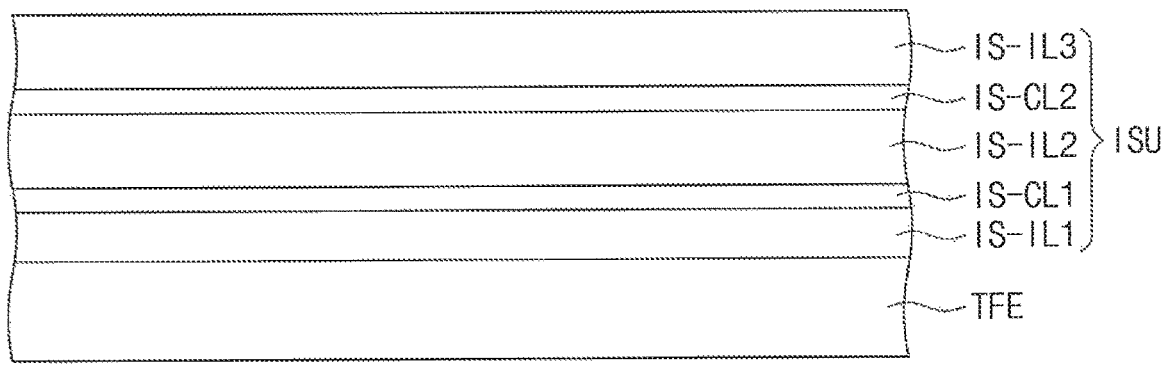
FIG. 4 is a cross-sectional view showing an input sensing layer according to an embodiment of the present disclosure.

FIG. 4 is a cross-sectional view showing the input sensing layer ISU according to an embodiment of the present disclosure. FIG. 5A is a plan view showing the input sensing layer ISU according to an embodiment of the present disclosure. FIG. 5B is a cross-sectional view taken along a line X-X' of FIG. 5A. FIG. 5C is a cross-sectional view taken along a line Y-Y' of FIG. 5A.

Referring to FIG. 4, the input sensing layer ISU may include a first sensing insulating layer IS-IL1, a first conductive layer IS-CL1, a second sensing insulating layer IS-IL2, a second conductive layer IS-CL2, and a third sensing insulating layer IS-IL3. The first sensing insulating layer IS-IL1, first conductive layer IS-CL1, second sensing insulating layer IS-IL2, second conductive layer IS-CL2, and third sensing insulating layer IS-IL3 may be sequentially arranged. The first sensing insulating layer IS-IL1 may be disposed directly on the thin film encapsulation layer TFE, however, the present disclosure should not be limited thereto or thereby. The first sensing insulating layer IS-IL1 may be omitted, and in this case, the first conductive layer IS-CL1 may be disposed directly on the thin film encapsulation layer TFE. The structure in which the first conductive layer IS-CL1 is disposed directly on the thin film encapsulation layer TFE will be described in detail later with reference to FIGS. 5C and 5D.

Each of the first conductive layer IS-CL1 and the second conductive layer IS-CL2 may have a single-layer structure or a multi-layer structure of layers stacked in the third direction DR3. The first or second conductive layer IS-CL1 or IS-CL2 having the multi-layer structure may include at least two layers among transparent conductive layers and metal layers. The first or second conductive layer IS-CL1 or IS-CL2 having the multi-layer structure may include metal layers including different metals from each other.

The first conductive layer IS-CL1 may include molybdenum, silver, titanium, copper, aluminum, or alloys thereof. For instance, the first conductive layer IS-CL1 may have a three-layer structure of titanium/aluminum/titanium as a metal layer structure. In this case, a metal layer having a relatively high durability and a relatively low reflectance may be applied as an outer layer, and a metal layer having a high electrical conductivity may be applied as an inner layer. The second conductive layer IS-CL2 may be a transparent conductive layer including indium tin oxide (ITO), indium zinc oxide (IZO), zinc oxide (ZnO), indium tin zinc oxide (ITZO), PEDOT, a metal nanowire, or a graphene.

According to an embodiment of the present disclosure, the structure of the conductive layer included in the first conductive layer IS-CL1 and the second conductive layer IS-CL2 may be changed in various ways. For instance, the first conductive layer IS-CL1 may be a transparent conductive layer, and the second conductive layer IS-CL2 may be a metal layer. Sensing electrodes may be disposed on the second conductive layer IS-CL2, and connection electrodes may be disposed on the first conductive layer IS-CL1. This will be described in detail later.

Each of the first sensing insulating layer IS-IL1, the second sensing insulating layer IS-IL2, and the third sensing insulating layer IS-IL3 may include an inorganic layer or an organic layer. In the present embodiment, the first sensing insulating layer IS-IL1 may be the inorganic layer, however, it should not be limited thereto or thereby. For instance, the first sensing insulating layer IS-IL1 and the second sensing insulating layer IS-IL2 may be the inorganic layer, and the third sensing insulating layer IS-IL3 may be the organic layer.

Figure 5A:
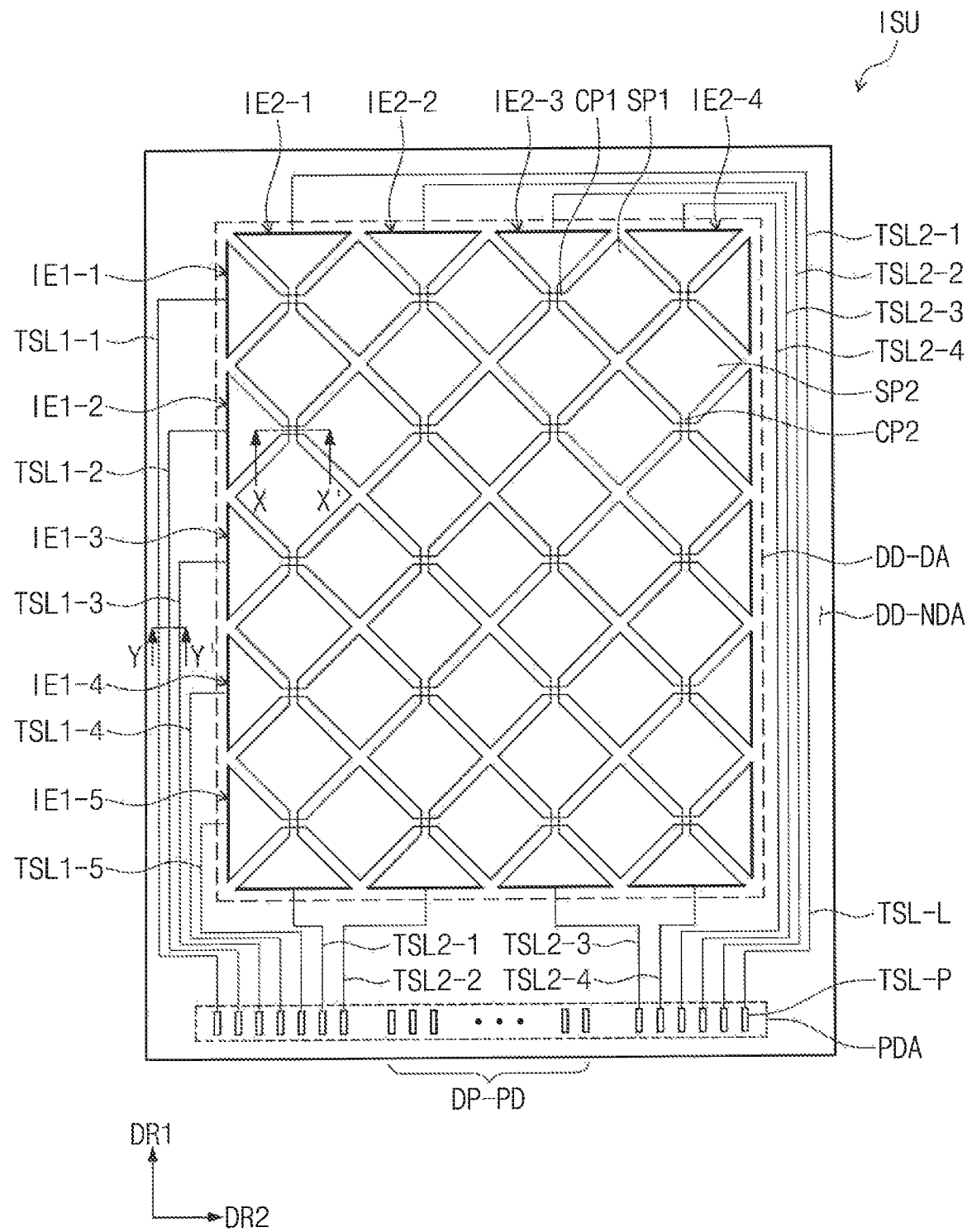
FIG. 5A is a plan view showing an input sensing layer according to an embodiment of the present disclosure.
Figure 5B:
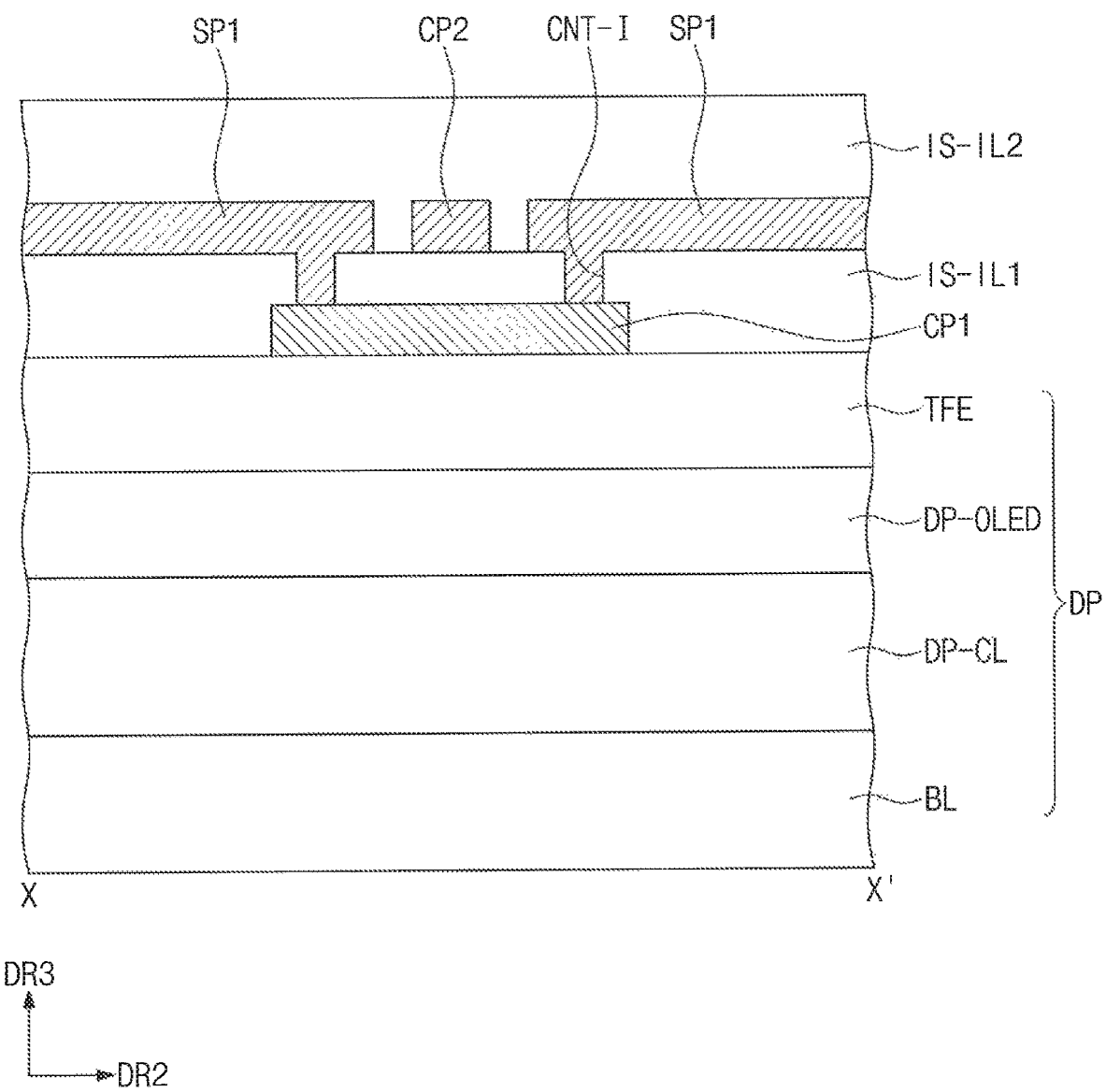
FIG. 5B is a cross-sectional view taken along a line X-X' of FIG. 5A.
Figure 5C:
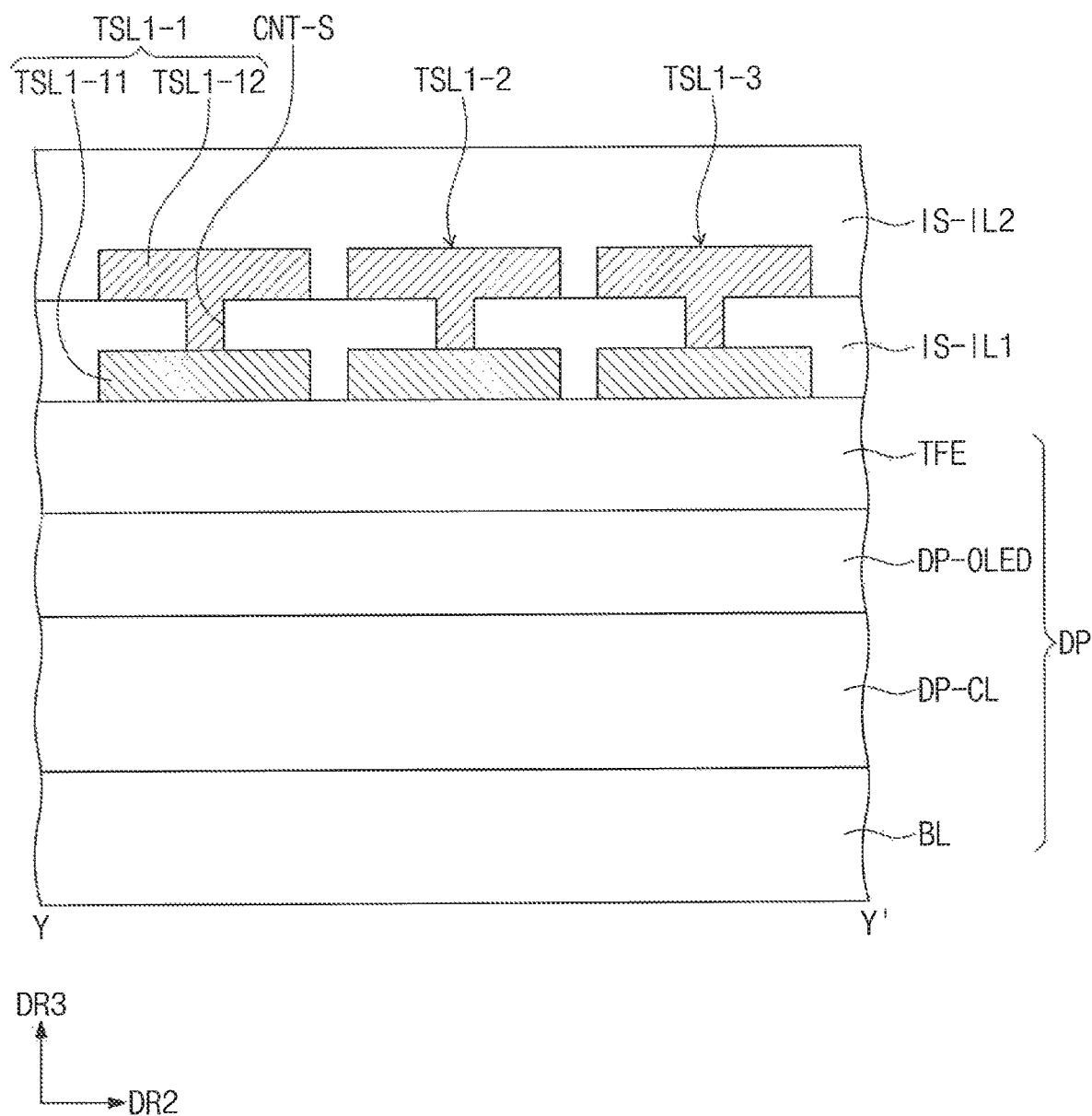
FIG. 5C is a cross-sectional view taken along a line Y-Y' of FIG. 5A.

FIG. 5A is a plan view showing the input sensing layer ISU according to an embodiment of the present disclosure.

FIG. 5A shows first sensing electrodes IE1-1, IE1-2, IE1-3, IE1-4 and IE1-5 and second sensing electrodes IE2-1, IE2-2, IE2-3 and IE2-4 according to an embodiment of the present disclosure, however, shapes of the first and second sensing electrodes IE1-1 to IE1-5 and IE2-1 to IE2-4 should not be limited thereto or thereby. According to an embodiment of the present disclosure, the first sensing electrodes IE1-1 to IE1-5 and the second sensing electrodes IE2-1 to IE2-4 may have a bar shape in which a sensor portion and a connection portion are not distinguished from each other. First sensor portions SP1 and second sensor portions SP2 are shown as having a lozenge shape, however, they should not be limited thereto or thereby. According to an embodiment of the present disclosure, the first sensor portions SP1 and the second sensor portions SP2 may have another polygonal shape.

The first sensor portions SP1 may be arranged in the second direction DR2 in one first sensing electrode, and the second sensor portions SP2 may be arranged in the first direction DR1 in one second sensing electrode. For example, the first sensor portions SP1 of the first sensing electrode IE1-1 may form a first row and the second sensor portions SP2 of the second sensing electrode IE2-1 may form a first column intersected with the first row. Each of first connection portions CP1 may connect the first sensor portions SP1 adjacent to each other, and each of second connection portions CP2 may connect the second sensor portions SP2 adjacent to each other. The first connection portions CP1 and the second connection portions CP2 may overlap each other.

First signal lines TSL1-1, TSL1-2, TSL1-3, TSL1-4 and TSL1-5 may be respectively connected to one ends of the first sensing electrodes IE1-1 to IE1-5. Second signal lines TSL2-1, TSL2-2, TSL2-3 and TSL2-4 may be respectively connected to both ends of each of the second sensing electrodes IE2-1 to IE2-4. For example, in FIG. 5A, the first signal lines TSL1-1 to TSL1-5 are respectively connected to the first sensing electrodes IE1-1 to IE1-5 at the left side of the input sensing layer ISU and the second signal lines TSL2-1 to TSL2-4 are respectively connected to the second sensing electrodes IE2-1 to IE2-4 at top and bottom sides of the input sensing layer ISU. However, the present disclosure should not be limited thereto or thereby. According to an embodiment of the present disclosure, the first signal lines TSL1-1 to TSL1-5 may also be respectively connected to both ends of the first sensing electrodes IE1-1 to IE1-5. According to an embodiment of the present disclosure, the second signal lines TSL2-1 to TSL2-4 may be respectively connected to only one end of the second sensing electrodes IE2-1 to IE2-4.

According to the present embodiment, a sensing sensitivity may be improved compared with the input sensing layer ISU including the second signal lines TSL2-1 to TSL2-4 that are respectively connected to only one end of the second sensing electrodes IE2-1 to IE2-4. Since the second sensing electrodes IE2-1 to IE2-4 have a length longer than that of the first sensing electrodes IE1-1 to IE1-5, a voltage drop may occur in a detection signal (or a transmission signal), and thus, the sensing sensitivity may be deteriorated. According to the present embodiment, since the detection signal (or the transmission signal) is provided via the second signal lines TSL2-1 to TSL2-4 respectively connected to both ends of the second sensing electrodes IE2-1 to IE2-4, the voltage drop in the detection signal (or the transmission signal) may be prevented from occurring, and thus, the deterioration of the sensing sensitivity may be prevented.

The first signal lines TSL1-1 to TSL1-5 and the second signal lines TSL2-1 to TSL2-4 may include a line part TSL-L and the pad part TSL-P. The pad part TSL-P may be arranged in the pad area PDA. The pad part TSL-P may overlap the dummy pads IS-DPD shown in FIG. 3B.

The circuit board 300 (refer to FIG. 2) may be coupled with the pad part TSL-P. The pad part TSL-P may be electrically connected to a first pad of the circuit board 300 (refer to FIG. 2), which is to be described later.

The input sensing layer ISU may include signal pads DP-PD. The signal pads DP-PD may be arranged in the pad area PDA. The pad area PDA may be bent. In other words, the pad area PDA may be provided on the bending part 220 (refer to FIG. 2).

As shown in FIG. 5A, the pad part TSL-P of the first signal lines TSL1-1 to TSL1-5 and the pad part TSL-P of the second signal lines TSL2-1 to TSL2-4 may be disposed in different areas from each other with the signal pads DP-PD interposed therebetween. Since two groups of the pad parts TSL-P are disposed to be spaced apart from each other, the structure of the circuit board may be simplified. For example, a first side of the signal pads DP-PD may include the pad part TSL-P of the first signal lines TSL1-1 to TSL1-5 respectively connected to the first sensing electrodes IE1-1 to IE1-5 at a left side of the input sensing layer ISU and the pad part TSL-P of the second signal lines TSL2-1 and TSL2-2 respectively connected to the second sensing electrodes IE2-4 to IE2-2 at a bottom side of the input sensing layer ISU. A second side of the signal pads DP-PD may include the pad part TSL-P of the second signal lines TSL2-1 to TSL2-4 respectively connected to the second sensing electrodes IE2-4 to IE2-4 at a top side of the input sensing layer ISU and the pad part TSL-P of the second signal lines TSL2-3 and TSL2-4 respectively connected to the second sensing electrodes IE2-3 to IE2-4 at a bottom side of the input sensing layer ISU.

FIG. 5B is a cross-sectional view taken along a line X-X' of FIG. 5A. Referring to FIG. 5B, the first sensor portions SP1 may be electrically connected to the first connection portion CP1 via first connection contact holes CNT-1. The first connection portion CP1 may include a material having a resistance lower than that of the first sensor portions SP1.

The first connection portion CP1 may cross the second connection portion CP2 in a plane, and a width, which is measured in a plane, of the first connection portion CP1 maybe minimized to reduce an influence of a parasitic capacitance. The first connection portion CP1 may include a material having a low resistance to improve the sensing sensitivity and may include the same metal material as the first signal lines TSL1-1 to TSL1-5.

In the present embodiment, the first sensing insulating layer IS-IL1 may include a polymer layer, e.g., an acrylic polymer layer. The second sensing insulating layer IS-IL2 may also include a polymer layer, e.g., an acrylic polymer layer. The polymer layer may increase flexibility of the display device DD (refer to FIG. 2) even though the input sensing layer ISU is disposed directly on the display panel DP. The first sensor portions SP1 and the second sensor portions SP2 may have a mesh shape and may include a metal material to increase the flexibility. The first sensor portions SP1 and the second sensor portions SP2 may be referred to as a metal mesh pattern.

FIG. 5C is a cross-sectional view taken along a line Y-Y' of FIG. 5A. FIG. 5C shows three first signal lines TSL1-1 to TSL1-3 among the first signal lines TSL1-1 to TSL1-5 as an example. Referring to the first signal line TSL1-1, a first line part TSL1-11 and a second line part TSL1-12 may be electrically connected to each other via second connection contact holes CNT-S. Accordingly, the resistance of the first signal line TSL1-1 may be reduced. The first line part TSL1-11 and the second line part TSL1-12 may be parts of the first signal lines TSL1-1 to TSL1-3 except the pad part TSL-P (see FIG. 5A). According to an embodiment of the present disclosure, one of the first line part TSL1-11 and the second line part TSL1-12 may be omitted. Similarly, one of a first line part and a second line part of the second signal lines TSL2-1 to TSL2-4 may be omitted.

Figure 8A:
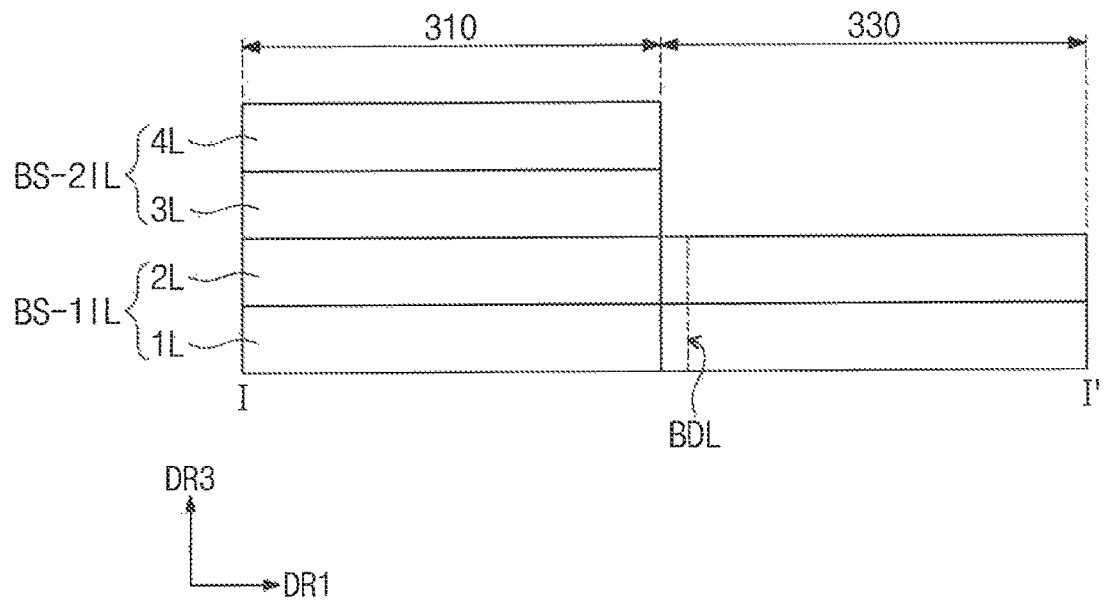
FIGS. 8A and 8B are cross-sectional views showing circuit boards according to an embodiment of the present disclosure.
Figure 8B:
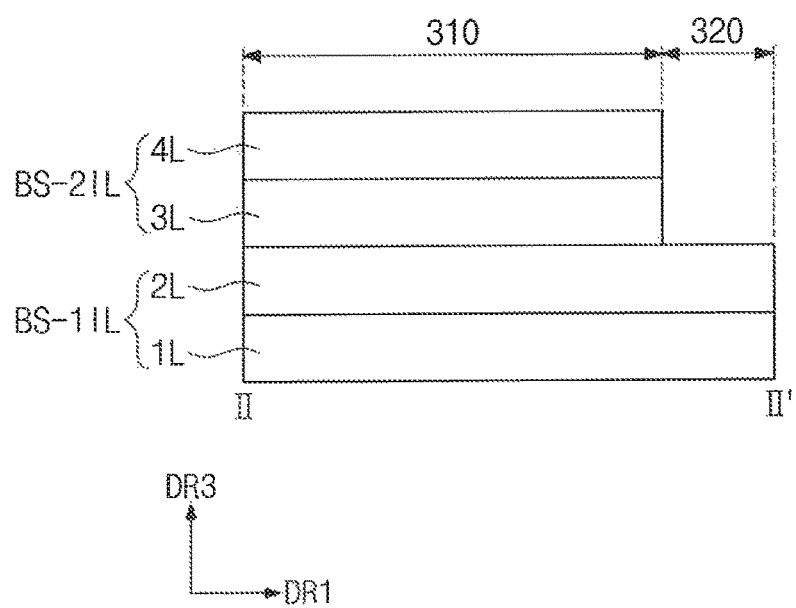

FIG. 6 is a perspective view showing the circuit board 300 according to an embodiment of the present disclosure. FIG. 7 is a plan view showing the circuit board 300 according to an embodiment of the present disclosure. FIGS. 8A and 8B are cross-sectional views showing circuit boards according to an embodiment of the present disclosure.

Referring to FIGS. 6 and 7, the circuit board 300 may include the body part 310, a pad part 320, and the line part 330. The pad part 320 and the line part 330 may be portions extending from the body part 310 in the first direction DR. For example, the pad part 320 may protrude from a side of the body part 310 in the first direction DR1.

The sensing driving chip T-IC, signal lines SL and TL, and pads MPD1 and MPD2 may be disposed on the circuit board 300. For example, the circuit board 300 may include the base substrate BS. The sensing driving chip T-IC, the signal lines SL and TL, and the pads MPD1 and MPD2 may be disposed on the base substrate BS. The base substrate BS may include a first insulating layer BS-1IL and a second insulating layer BS-2IL. The sensing driving chip T-IC may be disposed on the second insulating layer BS-2IL. The pads MPD1 and MPD2 may be disposed on the first insulating layer BS-1IL. The lines SL and TL may be disposed on the first insulating layer BS-1IL and the second insulating layer BS-2IL. The second insulating layer BS-2IL may be provided with a contact hole passing therethrough. Lines of the first insulating layer BS-1IL and lines of the second insulating layer BS-2IL may be electrically connected to the sensing driving chip T-IC via contact holes.

The sensing driving chip T-IC may be disposed on the body part 310. The pads MPD1 and MPD2 may be disposed in the pad part 320. A plurality of lines extending from the pads MPD1 and MPD2 of the pad part 320 may be disposed in the body part 310. For example, lines extending from the pads MPD1 and MPD2 may be arranged along a side surface of the body part 310 to an upper surface of the body part 310.

The lines may include the first signal line TL (also referred to as a first line) and the second signal line SL (also referred to as a second line). The pads may include a first pad MPD1 and a second pad MPD2. The first line TL may be electrically connected to the first pad MPD1, and the second line SL may be electrically connected to the second pad MPD2.

According to an embodiment of the present disclosure, the first line TL may connect the first pad MPD1 to the sensing driving chip T-IC. The second line SL may extend from the second pad MPD2. The first line TL may be connected to the input sensing layer ISU (refer to FIG. 5A) of the display module 200 (refer to FIG. 2) to receive an input sensing signal, and the second line SL may be connected to the display panel DP (refer to FIG. 3B) to receive a pixel driving signal. In other words, the first line TL and the second line SL may receive different electrical signals from each other.

The first line TL may be electrically connected to the first and second signal lines TSL1-1 to TSL1-5 (refer to FIG. 5A) and TSL2-1 to TSL2-4 (refer to FIG. 5A) of the input sensing layer ISU (refer to FIG. 5A). The first pad MPD1 connected to the first line TL may be electrically connected to the pad part TSL-P (refer to FIG. 5A) of the input sensing layer ISU.

The second line SL may be electrically connected to the signal line SGL of the display panel DP (refer to FIG. 3B). The second pad MPD2 connected to the second line SL may be electrically connected to the signal pads DP-PD (refer to FIG. 3B) that are connected to the signal line SGL connected to the pixels PX (refer to FIG. 3B) of the display panel DP.

The first pad MPD1 may include a first sub-pad MPD1-1 and a second sub-pad MPD1-2. The first sub-pad MPD1-1 and the second sub-pad MPD1-2 may be spaced apart from each other when viewed in a plane. The second pad MPD2 may be disposed between 0.10 the first sub-pad MPD1-1 and the second sub-pad MPD1-2 when viewed in a plane. The first sub-pad MPD1-1 may be disposed closer to the sensing driving chip T-IC than the second sub-pad MPD1-2 is.

The first line TL may include a first sub-line TL1 and a second sub-line TL2. One of the first sub-line TL1 and the second sub-line TL2 may connect the first sub-pad MPD1-1 to the sensing driving chip T-IC, and the other of the first sub-line TL1 and the second sub-line TL2 may connect the second sub-pad MPD1-2 to the sensing driving chip T-IC. As shown in FIGS. 6 and 7, the first sub-line TL1 may be connected to the first sub-pad MPD1-1, and the second sub-line TL2 may be connected to the second sub-pad MPD1-2.

The first sub-line TL1 connecting the first sub-pad MPD1-1 to the sensing driving chip T-IC may be disposed in the body part 310. The first sub-pad MPD1-1 may be adjacent to the sensing driving chip T-IC. The second sub-line TL2 connected to the second sub-pad MPD1-2 may connect the second sub-pad MPD1-2 to the sensing driving chip T-IC. In this case, since the second sub-pad MPD1-2 is not near the sensing driving chip T-IC, the second sub-line TL2 passes through the line part 330.

The second line SL may be disposed on the body part 310. The second line SL may be provided in plural. Two second lines SL-1 and SL-2 are shown in FIGS. 6 and 7, however, the number of the second lines SL should not be limited to two. The second line SL may cross (e.g., pass trough) the body part 310. For example, the second line SL may extend in a lengthwise direction (e.g., along the long side direction) of the body part 310. The second line SL may also extend along the short side direction of the body part 310. The second line SL may not overlap the first line TL in a plane and in a thickness direction of the base substrate BS. The second line SL may be disposed on the first insulating layer BS-1IL or the second insulating layer BS-2IL of the base substrate BS.

The second sub-line TL2 may cross (e.g., pass through) the line part 330 to be connected to the sensing driving chip T-IC without interfering the second line SL. Only the second sub-line TL2 may be disposed in the line part 330. Accordingly, the second sub-line TL2 may not overlap other lines including the second line SL.

The line part 330 may extend from the body part 310 in the same direction as the pad part 320 in the first direction DR1. The line part 330 may extend farther from the body part 310 than the pad part 320. According to an embodiment of the present disclosure, the line part 330 may be spaced apart from the pad part 320. For example, a space may be provided between the line part 330 and the pad part 320 along the first direction DR1 and the second direction DR2.

The line part 330 may include a first portion 330-1, a second portion 330-2, and a third portion 330-3. The first portion 330-1 and the second portion 330-2 may extend from the body part 310. The third portion 330-3 may be spaced apart from the body part 310 and the pad part 320 in the first direction DR1 and may connect the first portion 330-1 to the second portion 330-2. The second sub-line TL2 may extend from the sensing driving chip T-IC to second sub-pad MPD1-2 by passing through the second portion 330-2, the third portion 330-3 and the first portion 330-1 in sequence.

The line part 330 may be bent with respect to a bending line BDL. The bending line BDL may correspond to a boundary between the body part 310 and the line part 330. In other words, the line part 330 may be bent at a boundary between the body part 310 and the line part 330. The bending line BDL may be defined on the first portion 330-1 and the second portion 330-2.

According to an embodiment of the present disclosure, the first portion 330-1 may be disposed adjacent to the second sub-pad MPD1-2, and the second portion 330-2 may be disposed adjacent to the sensing driving chip T-IC. The second sub-line TL2 extending from the second sub-pad MPD1-2 may be electrically connected to the sensing driving chip T-IC after sequentially crossing (e.g., passing through) the first portion 330-1, the third portion 330-3, and the second portion 330-2.

The first line TL may include a first sensing line and a second sensing line. The sensing driving chip T-IC may apply a first sensing signal and a second sensing signal to the first pad MPD1 via the first sensing line and the second sensing line. According to an embodiment of the present disclosure, the first sub-line TL1 may include the first sensing line, and the second sub-line TL2 may include the second sensing line. According to an embodiment of the present disclosure, the first sub-line TL1 may include a first sensing line TL1-1 and a second sensing line TL1-2, and the second sub-line TL2 may include a first sensing line TL2-1 and a second sensing line TL2-2. For the convenience of explanation, each of the first sensing lines TL1-1 and TL2-1 is shown in a singular number, and each of the second sensing lines TL1-2 and TL2-2 is shown in a singular number, however, the above configurations may be provided in plural and may be electrically connected to the first pad MPD1.

Most of the second sub-line TL2 may be disposed in the line part 330, however, a portion of the second sub-line TL2 may cross (e.g., may be disposed on) the body part 310. In FIG. 7, a portion TL2-L1 of the second sub-line TL2, which is disposed in the line part 330, may connect other portions of the second sub-line TL2, which are disposed in the body part 310. A first portion TL2-B1 of the second sub-line TL2 may extend to the first portion 330-1 of the line part 330 beginning from the second sub-pad MPD1-2 after crossing (e.g., passing through) the body part 310. A second portion TL2-B2 of the second sub-line TL2 may extend from the second portion 330-2 of the line part 330 and may be connected to the sensing driving chip T-IC after crossing (e.g., passing through) the body part 310.

The first portion TL2-B1 and the second portion TL2-B2 of the second sub-line TL2, which cross (e.g., pass through) the body part 310, may not overlap the first sub-line TL1 and the second line SL.

FIG. 8A is a cross-sectional view taken along a line I-I' of FIG. 7. FIG. 8B is a cross-sectional view taken along a line II-II' of FIG. 7.

Referring to FIGS. 8A and 8B as well as FIG. 7, the body part 310 of the circuit board 300 may include the first insulating layer BS-1IL and the second insulating layer BS-21L, and the line part 330 may include the first insulating layer BS-1IL. The first insulating layer BS-1IL may include a first layer 1L and a second layer 2L, and the second insulating layer BS-2IL may include a third layer 3L and a fourth layer 4L. The first insulating layer BS-1IL of the body part 310 and the first insulating layer BS-1IL of the line part 330 may be distinguished from each other with respect to the bending line BDL. Each of the first layer IL to the fourth layer 4L may include a conductive layer. Each conductive layer may include plurality of lines. Each of the first layer 1L to the fourth layer 4L may include a copper layer and a polyimide (PI) layer.

The bending line BDL may be provided in the first insulating layer BS-1IL, and the first insulating layer BS-1IL may include flexible materials. According to an embodiment of the present disclosure, the first insulating layer BS-1IL may have a thickness smaller than a thickness of the second insulating layer BS-2IL. The plurality of lines may include the first line TL and the second line SL of FIG. 7.

Referring to FIG. 8B, the pad part 320 may include the first insulating layer BS-1IL. Conductive layers on which the first pad MPD1 and the second pad MPD2 are disposed may be disposed on the first insulating layer BS-1IL of the pad part 320 as shown in FIG. 7.

An embodiment of the present disclosure provides a circuit board 300 that includes: a body part 310 including a driving chip such as the sensing driving chip T-IC; a pad part 320 including a plurality of pads MPD1 and MPD2 connected to a plurality of lines such as the first line TL and the second line SL, wherein the pad part 320 extends in a first direction DR1 from the body part 310; and a line part 330 including the first line TL of the plurality of lines, wherein the first line TL is electrically connected to the driving chip, e.g., T-IC, the line part 330 extends in the first direction DR1 from the body part 310, and the line part 330 is bendable with respect to the bending line BDL.

Figure 9A:
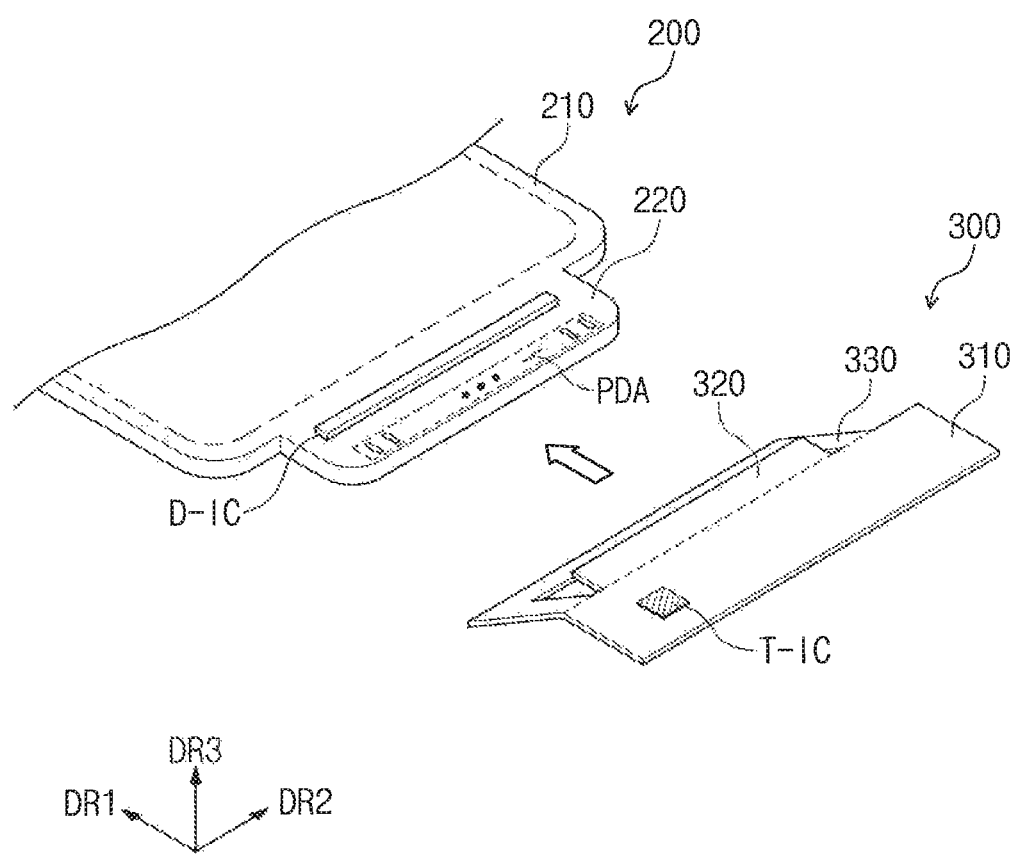
FIGS. 9A and 9B are perspective views showing a display device according to an embodiment of the present disclosure.
Figure 9B:
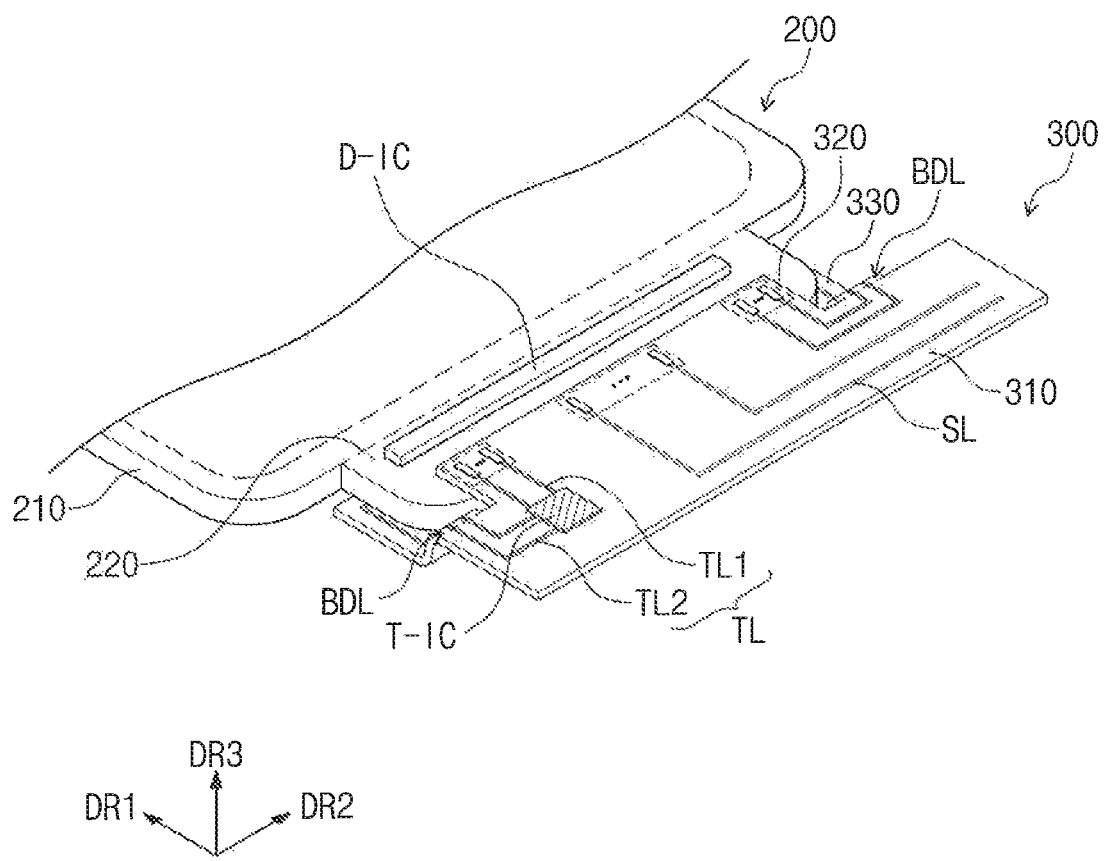

FIGS. 9A and 9B are perspective views showing the display device according to an embodiment of the present disclosure.

FIG. 9A shows a state in which the display module 200 is separated from the circuit board 300, and FIG. 9B shows a state in which the display module 200 is bonded to the circuit board 300.

Referring to FIGS. 9A and 9B, the circuit board 300 may be coupled with the bending part 220 of the display module 200. The bending part 220 may extend from one end of the display part 210. The bending part 220 may include the pixel driving chip D-IC. The pixel driving chip D-IC may be disposed adjacent to the display part 210 in the bending part 220. The pad area PDA may be provided in the bending part 220. The pad area PDA may be disposed closer to an outer portion of the bending part 220 than the pixel driving chip D-IC is. A plurality of pads may be disposed in the pad area PDA. The circuit board 300 may be bonded to the pads. The pad part 320 of the circuit board 300 may be bonded on the pad area PDA of the bending part 220. The plurality of pads includes signal pads DP-PD (refer to FIG. 3B).

In FIG. 9A, the line part 330 of the circuit board 300 may be bent towards a mar surface of the display module 200 before being coupled with the display module 200. In this case, the rear surface of the display module 200 may correspond to a surface on which the pixel driving chip D-IC is not disposed of the bending part 220. In other words, a surface in which the pixel driving chip D-IC is disposed of the bending part 220 (or the display module 200) is referred to as a front surface, and the surface on which the pixel driving chip D-IC is not disposed of the bending part 200 (or the display module 200) is referred to as the rear surface. In the coupling process, the bending part 220 of the display module 200 may approach between the line part 330 and the pad part 320 of the circuit board 300. The pad part 320 of the circuit board 300 may be bonded to a front surface of the bending part 220 of the display module 200.

In FIG. 9B, in the state where the circuit board 300 is bonded to the display module 200, the line part 330 of the circuit board 300 may be disposed on a rear surface of the bending part 220 of the display module 200. For example, the bending part 220 of the display module 200 may be provided between the line part 330 and the pad part 320 of the circuit board 300. Thus, the pad part 320 of the circuit board 300 may be disposed on the front surface of the bending part 220 of the display module 200, and the line part 330 may be disposed on the rear surface of the bending part 220.

In the present embodiment, the space occupied by the line part 330 may be reduced when compared with a conventional case. Accordingly, since the area for the circuit board 300 is reduced in the display device DD (refer to FIG. 1), the space of the display device DD may be efficiently used. The first line TL disposed in the line part 330 may not overlap other lines.

Figure 10A:
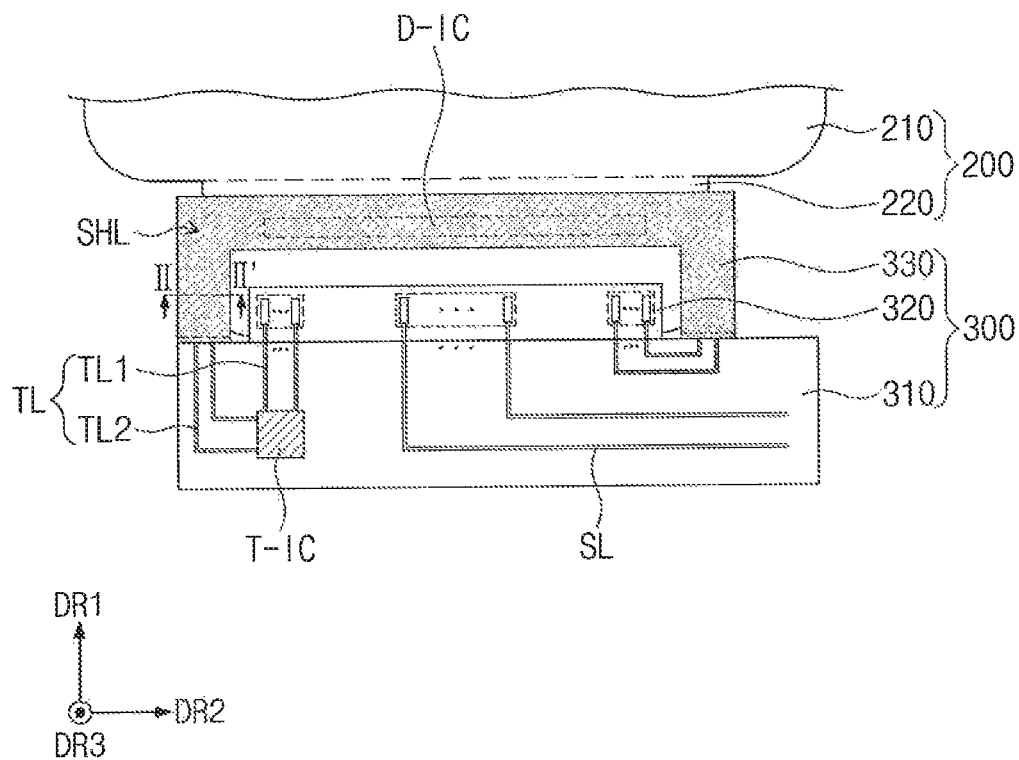
FIG. 10A is a plan view showing a display device according to an embodiment of the present disclosure.
Figure 10B:
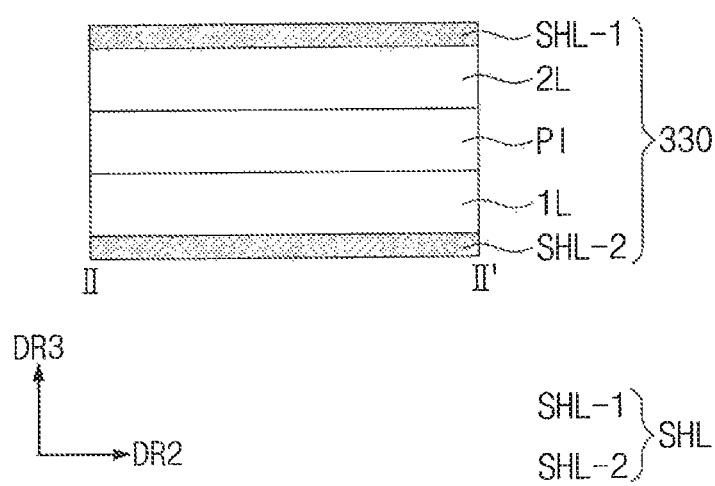
FIG. 10B is a cross-sectional view showing a display device according to an embodiment of the present disclosure.

FIG. 10A is a plan view showing a display device according to an embodiment of the present disclosure, and FIG. 10B is a cross-sectional view showing a display device according to an embodiment of the present disclosure.

Referring to FIG. 10A, in a state where a circuit board 300 is coupled with a display module 200, a line part 330 of the circuit board 300 may be disposed above a front surface of a bending part 220 on which a pixel driving chip D-IC is disposed. In other words, the line part 330 may be bent towards a front surface of the bending part 220. The line part 330 may overlap the pixel driving chip D-IC in the thickness direction. In this case, the line part 330 may include a shielding layer SHL. The shielding layer SHL may prevent a noise from occurring between the pixel driving chip D-IC and lines of the line part 330 overlapping the pixel driving chip D-IC. As an example, the shielding layer SHL may be an electrode electrically grounded. The shielding layer SHL may be an electromagnetic interference (EMI) tape that prevents electromagnetic interference.

FIG. 10B is a cross-sectional view taken along a line II-II' of FIG. 10A. In FIG. 10B, the shielding layer SHL may be disposed on an upper surface of the second layer 2L of the line part 330 and a lower surface of the first layer 1L of the line part 330. The shielding layer SHL may include a first shielding layer SHL-1 disposed on the upper surface of the second layer 2L of the line part 330 and a second shielding layer SHL-2 disposed on the lower surface of the first layer 1L of the line part 330. The line part 330 may include a polyimide (PI) layer disposed between a first layer 1L and a second layer 2L, which include copper. The first shielding layer SHL-1 and the second shielding layer SHL-2 may prevent an electromagnetic interference phenomenon from occurring between the line part 330 and the pixel driving chip D-IC adjacent thereto. In the present embodiment, the line part 330 may be disposed on the front surface of the bending part 220 of the display module 200, and in FIG. 10B a pad part 320 of the circuit board 300 may be disposed on and bonded to the front surface of the bending part 220 of the display module 200. In the present embodiment, different from those of FIGS. 9A and 9B, the pad part 320 may be disposed on the front surface of the bending part 220 of the display module 200, and the line part 330 may be disposed on the front surface of the bending part 220. Accordingly, it is not required to bend the line part 330 toward a rear surface of the display module 200 in the coupling process of the circuit board 300, and thus, the coupling process may be efficiently performed.

According to embodiments of the present disclosure described above, the circuit board includes the line part through which the first lines corresponding to the input sensing line among the plurality of lines cross (e.g., pass through). The line part is designed to extend toward the pad part of the circuit board and to be bent, and thus, the line part is bent towards the lower surface of the display module when the circuit board is attached to the display module. Thus, the line part of the circuit board is bent, the space of the display device is efficiently used, and the size of the display device is reduced.

While embodiments of the present disclosure have been described, it is understood that by one of ordinary skill in the art that variations in form and detail may be made thereto without departing from the spirit and scope of the present disclosure as set forth in the claiming scope.

What is claimed is:

1. A circuit board, comprising:
a body part including a driving chip;
a pad part including a plurality of pads connected to a plurality of lines, wherein the pad part extends in a first direction from the body part and a first long side of the pad part is disposed adjacent to and extends along a sidewall of the body part; and
a line part including a first line of the lines, wherein the first line is electrically connected to the driving chip, the line part extends in the first direction from the body part, and the line part is bendable with respect to a bending line,
wherein the first line comprises a first sub-line and a second sub-line, the first sub-line is disposed in the body part and the pad part, and the second sub-line is disposed in the body part and the line part,
wherein the pads comprise a first pad connected to the first line,
wherein the first pad comprises a first sub-pad and a second sub-pad, and
wherein the first sub-line extends from the body part to the pad part to connect the first sub-pad to the driving chip, and the second sub-line extends from the body part to the line part along a first short side of the pad part, along a second long side of the pad part opposite the first long side, along a second short side of the pad part opposite the first short side to the body part and to the pad part to connect the second sub-pad to the driving chip.

2. The circuit board of claim 1, wherein the bending line is a boundary between the body part and the line part.

3. The circuit board of claim 1, wherein the lines further comprise a second line, and the second line is disposed in the body part and does not overlap the first line.

4. The circuit board of claim 3, wherein the pads comprise a second pad connected to the second line.

5. The circuit board of claim 4, wherein the second pad is disposed between the first sub-pad and the second sub-pad.

6. The circuit board of claim 5, wherein the line part comprises:
a first portion disposed adjacent to the second sub-pad;
a second portion disposed adjacent to the driving chip; and
a third portion connecting the first portion and the second portion.

7. The circuit board of claim 1, wherein the pad part and the line part are spaced apart from each other.

8. The circuit board of claim 1, wherein the second sub-line comprises at least one of a first sensing line and a second sensing line, which receive different electrical signals from each other.

9. The circuit board of claim 1, wherein the line part comprises a shielding layer.

10. A circuit board, comprising:
a base substrate;
a driving chip disposed on the base substrate;
a plurality of signal pads disposed on the base substrate; and
a plurality of signal lines connecting the driving chip and the signal pads, the base substrate comprising:
a body part in which the driving chip is disposed;
a pad part in which the signal pads are disposed, the pad part extending in a first direction from the body part; and
a line part extending in the first direction from the body part and spaced apart from the pad part, the signal lines comprising:
a first line on the line part, wherein the first line is disposed on four sides of the pad part; and
a second line on the body part, wherein the line part is bendable.

11. The circuit board of claim 10, wherein the base substrate comprises:
a first insulating layer comprising the pad part and the line part; and
a second insulating layer disposed on the first insulating layer, wherein the driving chip is disposed on the second insulating layer.

12. The circuit board of claim 10, wherein the first line and the second line receive different electrical signals from each other and do not overlap each other.

13. A display device, comprising:
- a display module comprising a display panel and an input sensing layer, wherein the display module includes a display part and a bending part bendable from the display part; and
- a circuit board electrically coupled with the bending part, the circuit board comprising:
- a body part including a driving chip;
- a pad part including a plurality of pads bonded to the bending part, wherein the pad part extends toward the display panel from the body part; and
- a line part including a first line electrically connecting a first pad of the pads to the driving chip,
- wherein the line part extends in the same direction as the pad part, and the line part is spaced apart from the pad part and bendable with respect to a bending line, and wherein the first line is disposed on at least three sides of the pad part.

14. The display device of claim 11, wherein the first line comprises a first sensing line and a second sensing line, which are connected to the input sensing layer.

15. The display device of claim 13, further comprising a second line connected to the display panel via a second pad of the pads, wherein the second line is disposed in the body part and does not overlap the first line.

16. The display device of claim 13, wherein the display module further comprises a pixel driving chip disposed on a first surface of the bending part.

17. The display device of claim 16, wherein the line part is bent and disposed on a second surface of the bending part, which is opposite to the first surface of the bending part.

18. The display device of claim 16, wherein the line part comprises a shielding layer, and the line part is bent and disposed on the first surface of the bending part to overlap the pixel driving chip.

\* \* \* \* \*